US005973083A

United States Patent [19]

Matsushita et al.

[11] Patent Number: 5,973,083

[45] Date of Patent: *Oct. 26, 1999

[54] HIGH DENSITY ETHYLENE POLYMER AND METHOD FOR PRODUCING THE SAME

[75] Inventors: Fumio Matsushita, Kurashiki; Fumihiko Yamaguchi, Shizuoka-ken; Tsutomu Idehara, Kurashiki, all of Japan

[73] Assignee: Asahi Kasei Kogyo Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,046

[22] PCT Filed: Aug. 18, 1995

[86] PCT No.: PCT/JP95/01639

§ 371 Date: Mar. 27, 1997

§ 102(e) Date: Mar. 27, 1997

[87] PCT Pub. No.: WO96/06117

PCT Pub. Date: Feb. 29, 1996

[30] Foreign Application Priority Data

Aug. 18, 1994 [JP] Japan .................................... 6-215218

[51] Int. Cl.[6] ................................ C08F 4/02; C08F 10/02

[52] U.S. Cl. ......................... 526/129; 502/120; 526/127; 526/124.2; 526/348; 526/348.2; 526/348.3; 526/348.4; 526/348.5; 526/348.6; 526/352

[58] Field of Search .................................... 526/127, 129, 526/160, 352, 348, 348.2, 348.3, 348.4, 348.5, 348.6

[56] References Cited

U.S. PATENT DOCUMENTS

| | | | |
|---|---|---|---|
| 5,281,679 | 1/1994 | Jegelowo et al. | 526/352 |
| 5,286,818 | 2/1994 | Pettijohn | 526/352 |
| 5,324,698 | 6/1994 | Ala-Huikku et al. | 526/352 |
| 5,436,305 | 7/1995 | Alt et al. | 526/352 |
| 5,455,316 | 10/1995 | Tsutsui et al. | 526/160 |

FOREIGN PATENT DOCUMENTS

| | | |
|---|---|---|
| 0516458 | 12/1992 | European Pat. Off. . |
| 733652 | 9/1996 | European Pat. Off. . |
| A60-35008 | 2/1985 | Japan . |
| A61-276805 | 12/1986 | Japan . |
| A2-167311 | 6/1990 | Japan . |
| A3-234717 | 10/1991 | Japan . |
| A4-224808 | 8/1992 | Japan . |
| A4-225004 | 8/1992 | Japan . |
| A5-331232 | 12/1993 | Japan . |

*Primary Examiner*—Edward J. Smith
*Attorney, Agent, or Firm*—Birch, Stewart, Kolasch & Birch, LLP

[57] ABSTRACT

Disclosed is a high density ethylene polymer comprising a homopolymer of ethylene, or a copolymer of ethylene with at least one comonomer selected from an α-olefin, a cyclic olefin, and linear, branched and cyclic dienes, and having the following properties: (a) a density d ($g/cm^3$) of from 0.951 to 0.980; (b) an $M_I$ (g/10 minutes) of more than 3 and not more than 100 ($M_I$ is the melt flow rate as measured at 190° C. under a load of 2.16 kg); (c) the polymer satisfying: $\log a_{kI} \geqq -0.844 \log M_I + 1.462$ [$M_I$ is as defined above, and $a_{kI}$ is the Izod impact strength ($kgf{\cdot}cm/cm^2$)]; (d) the polymer satisfying: $\log M_{IR} \geqq -0.094 \log M_I + 1.520$ [$M_I$ is as defined above, and $M_{IR}$ is the $H_{MI}/M_I$ ratio in which $H_{MI}$ (g/10 minutes) is the melt flow rate as measured at 190° C. under a load of 21.6 kg and $M_I$ is as defined above]; and wherein (e) the d ($g/cm^3$) and the $M_I$ (g/10 minutes) satisfy: $d \geqq -0.00873 \log M_I + 0.972$. The ethylene polymer has excellent mechanical properties and excellent moldability, and can be advantageously produced by use of a catalyst comprising (A) a specific transition metal compound containing, as a ligand, an unsubstituted or substituted indenyl group, or di or tri substituted cyclopentadienyl group; (B) an inorganic solid component comprising a particulate inorganic solid having OH groups on a surface thereof and, carried thereon, an organoaluminumoxy compound having an alkyl group; and (C) an organoaluminum compound.

8 Claims, 5 Drawing Sheets

○ Examples 1 to 5
● Examples 6 to 9
◇ Example 10
◆ Example 11
■ Ziegler
△ Comparative Examples 1 and 2
100.0
10.0
1.0
Izod Impact Strength (kgf·cm/cm2)
MI (g/10 min)

MIR
100.0
10.0
1.0
10.0
100.0
MI (g/10 min)
Examples 1 to 5
Examples 6 to 9
Example 10
Example 11
Comparative Examples 1 and 2

$10^2$
$10^3$
$10^4$
$10^5$
$10^6$
$10^7$
$10^8$

HIGH DENSITY ETHYLENE POLYMER AND METHOD FOR PRODUCING THE SAME

BACKGROUND OF THE INVENTION

1. Field of The Invention

The present invention relates to a high density ethylene polymer and a method for producing the same. More particularly, the present invention is concerned with a high density ethylene polymer which is advantageous in that it has not only excellent mechanical properties, such as high impact resistance and high stiffness, but also excellent moldability, such as high melt flowability, and a method for producing the same.

2. Prior Art

High density ethylene polymers have been put into a wide variety of practical uses in the form of molded articles produced by various molding methods. For example, as a representative method for obtaining a molded film, there can be mentioned an inflation method in which a high density ethylene polymer is melted and the resultant molten polymer is extruded through a die while blowing air into the molten polymer being extruded, to thereby inflate the molten polymer extrudate. Further, as examples of methods for producing molded articles having desired shapes, there can be mentioned a blow molding method in which a high density ethylene polymer in the molten state is introduced into the cavity of a mold to form a molten polymer mass in the cavity. Air is blown into the molten polymer mass in the mold cavity, thereby causing the molten polymer mass to be expanded and pressed onto the inner wall of the cavity. Also an injection molding method is known in which a high density ethylene polymer in the molten state is injected under pressure into the cavity of a mold to fill the cavity.

To all of these various molding methods for high density ethylene polymers, it is common that a melt-molding operation be performed in which a high density ethylene polymer is melted by heating and the resultant molten polymer is molded. Therefore, the behavior of the high density ethylene polymer at heat-melting, i.e., melt properties, are extremely important in molding the high density ethylene polymer.

Especially in the injection molding method, melt properties, especially melt flowability, of a high density ethylene polymer are crucially important for achieving a satisfactory molding.

In the present invention, the term "melt flowability" means a property corresponding to the extrusion load at extrusion of a molten resin through an extruder. As examples of indices which can be used as a yardstick for melt flowability, there can be mentioned $M_I$, $H_{MI}$ and $M_{IR}$.

In the present invention, $M_I$ means an MFR (melt flow rate) as measured at 190° C. under a load of 2.16 kg. $H_{MI}$ means an MFR as measured at 190° C. under a load of 21.6 kg. $M_{IR}$ means the ratio of $H_{MI}$ to $M_I$, that is, $H_{MI}/M_I$.

In general, with respect to each of $M_I$, $H_{MI}$ and $M_{IR}$, the larger the value, the higher the melt flowability.

However, in practice, the desired properties of a polymer as a molding material vary depending on the molding method employed. Therefore, which index can be suitably used as a yardstick for melt flowability varies depending on the molding method employed. For example, in the injection molding method, for surely obtaining a molded product having high impact resistance, there is a tendency to use a high density ethylene polymer having a narrow molecular weight distribution. In general, a high density ethylene polymer having a narrow molecular weight distribution has a small $M_{IR}$, so that, as an index for melt flowability, $M_I$ and $H_{MI}$ are mainly used.

Conventionally, a high density ethylene polymer for use in the injection molding method has generally been produced by a polymerization using a Ziegler-Natta catalyst, which contains titanium, or using a chromium-containing catalyst. However, in general, a high density ethylene polymer produced by using such a conventional catalyst tends to have a broad molecular weight distribution, and it has been impossible to render a molecular weight distribution narrower than a certain breadth. In order to solve this problem, it has been attempted to improve the moldability of a high density ethylene polymer to be used for injection molding by lowering the molecular weight of the polymer so that the values $M_I$ and $H_{MI}$ can be increased. However, this attempt has led to a disadvantage in that the produced high density ethylene polymer virtually contains extremely low molecular weight components, so that the mechanical properties, such impact resistance, of the polymer are markedly lowered. That is, when good mechanical properties are desired, $M_I$ and the like cannot be largely increased. This means that, for example, injection molding cannot be performed at a high rate.

On the other hand, it has recently been found that when a catalyst system comprising a solvent-soluble transition metal compound containing at least one halogen, such as bis(cyclopentadienyl)zirconium dichloride, and an aluminoxane is used for homopolymerization of ethylene or copolymerization of ethylene with an $\alpha$-olefin, the catalyst system exhibits high polymerization activity. With respect to the details of this technique, reference can be made to, for example, Examined Japanese Patent Application Publication No. 4-12283 (corresponding to DE 3127133.2). Further, an improved technique over the technique disclosed in the above-mentioned Examined Japanese Patent Application Publication No. 4-12283 is disclosed in, for example, Unexamined Japanese Patent Application Laid-Open Specification No. 60-35007. The catalyst system proposed in these prior art documents is attracting attention as the so-called metallocene catalyst system. By using such a metallocene catalyst system, an ethylene polymer having a narrow molecular weight distribution can be produced, wherein, when the ethylene polymer produced is an ethylene copolymer, the copolymer has not only a narrow molecular weight distribution, but also a narrow copolymerization distribution (i.e., narrow distribution with respect to the proportions of different component monomer units constituting the copolymer). By virtue of having a narrow molecular weight distribution, an ethylene polymer produced by using such a metallocene catalyst system has advantages in that it has high mechanical properties, such as high impact resistance, that it is substantially free of low molecular weight components and high molecular weight components (both of which pose problems, such as high tack and gellation), and that it has excellent properties, such as high resistance to solvent extraction and high transparency. Therefore, energetic researches have conventionally been made on the use of a metallocene catalyst system mainly for producing, for example, a linear low density ethylene polymer (LLDPE), a very low density ethylene polymer (VLDPE) and an ultralow density ethylene polymer (ULDPE). As mentioned above, on one hand, an ethylene polymer produced by using a metallocene catalyst system has such great advantages by virtue of the narrow molecular weight distribution thereof; however, on the other hand, such an ethylene polymer has a problem in that it has an extremely poor moldability due to its narrow molecular weight distribution. Because of this problem, conventionally, with respect to the development of the application of a metallocene catalyst system in production of high density ethylene polymers, which are required to have a good balance between mechanical properties and moldability, a remarkable progress has not yet been achieved.

In order to solve the above-mentioned problem, it has been proposed to broaden a molecular weight distribution by using, for example, a method in which use is made of a plurality of reactors or a method in which use is made of a plurality of types of metallocene catalysts in combination. Specifically, Unexamined Japanese Patent Application Laid-Open Specification No. 60-35008 proposes a method for rendering a broad molecular weight distribution wherein use is made of a mixture of at least two types of transition metal compounds as a catalyst. Further, a method for rendering a broad molecular weight distribution by using a customary multi-step polymerization process is known. For example, Unexamined Japanese Patent Application Laid-Open Specification No. 3-234717 discloses a method for improving the melt properties of a polymer, wherein a multi-step polymerization process is performed by using an olefin polymerization catalyst comprising a transition metal compound and an organoaluminumoxy compound. Further, for example, in Unexamined Japanese Patent Application Laid-Open Specification Nos. 61-57638, 6-49287, 6-136195 and 6-206939, it is attempted to improve the moldability-of a polymer by taking a measure to broaden the molecular weight distribution. When these conventional methods for rendering a broad molecular weight distribution are used, the moldability is improved; however, a lowering of other properties inevitably occurs, so that it becomes impossible to obtain a high density ethylene polymer product having excellent properties, such as high mechanical properties, which are achieved by a narrow molecular weight distribution.

In Unexamined Japanese Patent Application Laid-Open Specification Nos. 7-90021 and 7-97408, with respect to the production of a film by inflation molding, it is attempted to improve moldability, such as the stability of a bubble (i.e., a molten polymer tube inflated for forming a film therefrom), by a method in which melt tension is increased by maintaining a relatively high intrinsic viscosity. However, such a method has a problem in that a lowering of melt flowability inevitably occurs, so that it becomes difficult to perform molding at a high rate.

In order to solve these problems, in the production of an ethylene copolymer by using a metallocene catalyst, it has recently been attempted to produce an ethylene copolymer which is advantageous in that it not only has both a narrow copolymerization distribution and a narrow molecular weight distribution, but also has excellent melt properties. For example, International Patent Application Publication No. W093/08221 proposes a method for producing an ethylene copolymer having improved melt flowability while maintaining a narrow molecular weight distribution thereof. In this proposed method, copolymerization is performed by using a specific metallocene catalyst to thereby cause the ethylene copolymer to have a long branched chain. However, such an ethylene copolymer has a problem in that, although the melt flowability is improved to some extent, the mechanical properties, such as impact resistance, are considerably lowered, as compared with those of an ethylene copolymer produced by using an ordinary metallocene catalyst.

As described hereinabove, the prior art techniques have problems in that it is impossible to obtain an excellent high density ethylene polymer having both excellent mechanical properties and high melt flowability.

Therefore, if an excellent high density ethylene polymer having both excellent mechanical properties and high melt flowability is obtained, the above-mentioned problems accompanying the ethylene polymer produced by using a titanium-containing Ziegler-Natta catalyst or a chromium-containing catalyst, and also the above-mentioned problems accompanying the ethylene polymer produced by using a conventional metallocene catalyst can be completely solved and the application fields of ethylene polymers can be greatly expanded. That is, such an excellent high density ethylene polymer is of extremely great commercial significance.

SUMMARY OF THE INVENTION

The present inventors have made extensive and intensive studies with a view toward developing a novel high density ethylene polymer having both excellent mechanical properties and high melt flowability. As a result, it has surprisingly been found that, by using a specific metallocene catalyst selected from among the metallocene catalysts previously developed by the present inventors as olefin polymerization catalysts especially useful for producing a low density ethylene polymer (see International Patent Application Publication No. WO95/15985), a high density ethylene polymer having both excellent mechanical properties and high melt flowability can be obtained, so that the obtained high density ethylene polymer can exhibit both extremely high mechanical strength and extremely excellent moldability. The present invention has been completed, based on this novel finding.

Accordingly, it is an object of the present invention to provide a high density ethylene polymer which is advantageous in that it has not only excellent mechanical properties, such as high impact resistance and high stiffness, but also excellent moldability, such as high melt flowability.

It is another object of the present invention to provide a method for producing the above-mentioned excellent high density ethylene polymer effectively and efficiently.

The foregoing and other objects, features and advantages of the present invention will be apparent from the following detailed description and appended claims taken in connection with the accompanying drawings.

DESCRIPTION OF THE INVENTION

Figure 1:
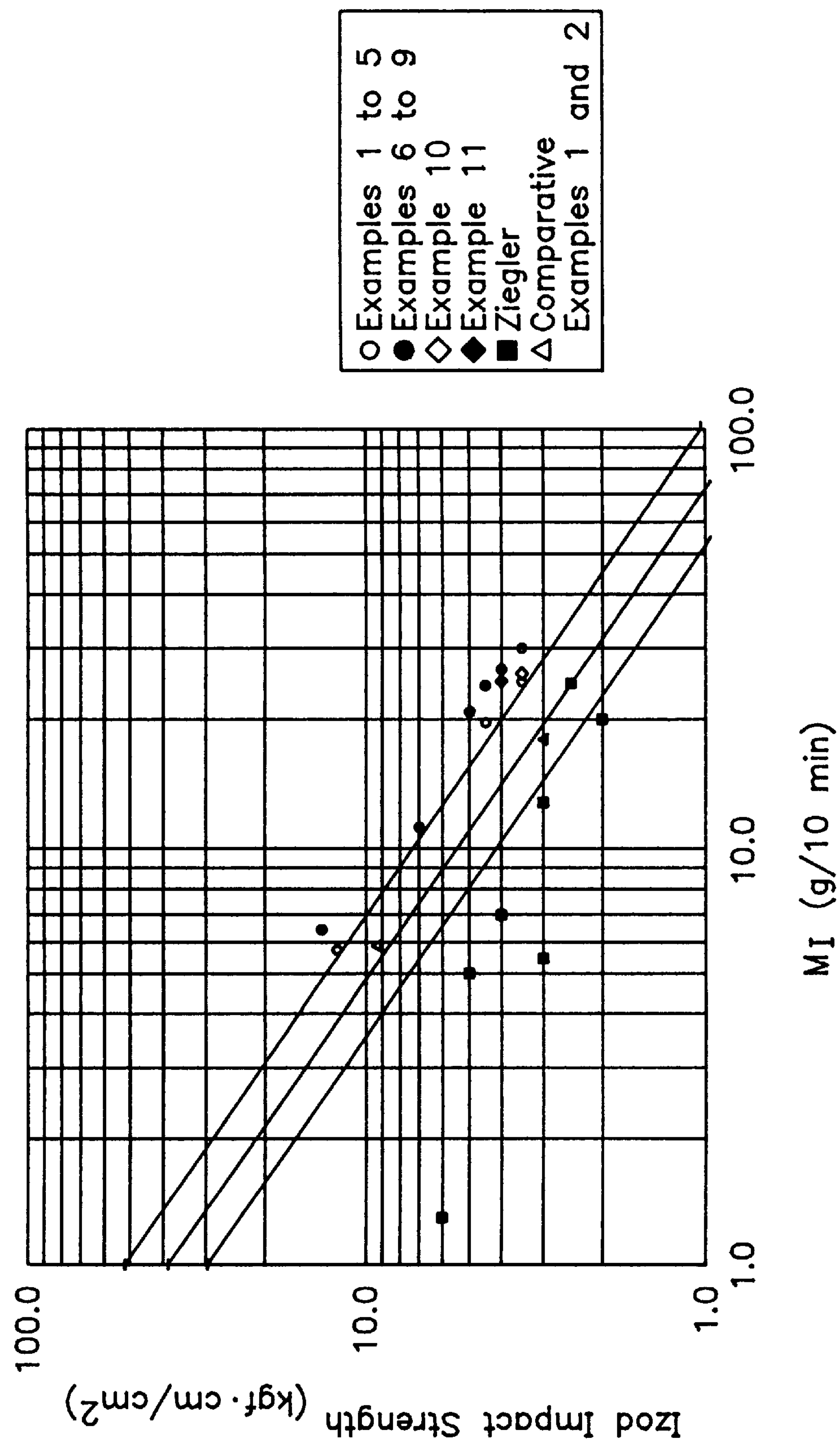
FIG. 1 shows the relationship between the $M_I$ and the Izod impact strength with respect to each of the high density ethylene polymers of the present invention, in comparison with the relationship between those of each of the comparative ethylene polymers.

In one aspect of the present invention, there is provided a high density ethylene polymer comprising a homopolymer of ethylene, or a copolymer of ethylene with at least one comonomer selected from the group consisting of an α-olefin, a cyclic olefin, and linear, branched and cyclic dienes, and having the following properties (a) to (e):

(a) a density d (g/$cm^3$) of from 0.951 to 0.980;

(b) an $M_I$ (g/10 minutes) of more than 3 and not more than 100, wherein $M_I$ is defined as the melt flow rate as measured at 190° C. under a load of 2.16 kg;

(c) the ethylene polymer satisfying the following relationship:

$$\log a_{kI} \geqq -0.844 \log M_I + 1.462$$

wherein $M_I$ is as defined above, and $a_{kI}$ represents the Izod impact strength (kgf·cm/$cm^2$);

(d) the ethylene polymer satisfying the following relationship:

$$\log M_{IR} \geqq -0.094 \log M_I + 1.520$$

wherein $M_I$ is as defined above, and $M_{IR}$ represents the $H_{MI}/M_I$ ratio in which $H_{MI}$ (g/10 minutes) is defined as the melt flow rate as measured at 190° C. under a load of 21.6 kg and $M_I$ is as defined above; and wherein (e) the density d (g/$cm^3$) and the $M_I$ (g/10 minutes) satisfy the following relationship:

$$d \geqq -0.00873 \log M_I + 0.972.$$

The above-mentioned high density ethylene polymer is a novel high density ethylene polymer which has an excellent balance between various properties, such as impact resistance, stiffness and melt flowability.

For easy understanding of the present invention, the essential features and various preferred embodiments of the present invention are enumerated below.

1. A high density ethylene polymer comprising a homopolymer of ethylene, or a copolymer of ethylene with at least one comonomer selected from the group consisting of an α-olefin, a cyclic olefin, and linear, branched and cyclic dienes, and having the following properties (a) to (e):

(a) a density d (g/$cm^3$) of from 0.951 to 0.980;

(b) an $M_I$ (g/10 minutes) of more than 3 and not more than 100, wherein $M_I$ is defined as the melt flow rate as measured at 190° C. under a load of 2.16 kg;

(c) the ethylene polymer satisfying the following relationship:

$$\log a_{kI} \geqq -0.844 \log M_I + 1.462$$

wherein $M_I$ is as defined above, and $a_{kI}$ represents the Izod impact strength (kgf·cm/$cm^2$);

(d) the ethylene polymer satisfying the following relationship:

$$\log M_{IR} \geqq -0.094 \log M_I + 1.520$$

wherein $M_I$ is as defined above, and $M_{IR}$ represents the $H_{MI}/M_I$ ratio in which $H_{MI}$ (g/10 minutes) is defined as the melt flow rate as measured at 190° C. under a load of 21.6 kg and $M_I$ is as defined above; and wherein (e) the density d (g/$cm^3$) and the $M_I$ (g/10 minutes) satisfy the following relationship:

$$d \geqq -0.00873 \log M_I + 0.972.$$

2. The high density ethylene polymer according to item 1 above, having an Mw/Mn ratio in the range of from 5.0 to 10.0, wherein Mw and Mn, respectively, represent the weight average molecular weight and the number average molecular weight, each measured by gel permeation chromatography.

3. The high density ethylene polymer according to item 1 or 2 above, which is an injection molding material.

4. The high density ethylene polymer according to any one of items 1 to 3 above, wherein the $M_I$ is more than 5.

5. The high density ethylene polymer according to any one of items 1 to 4 above, wherein the density d is 0.955 or more.

6. The high density ethylene polymer according to any one of items 1 to 5 above, which is a copolymer of ethylene with at least one comonomer selected from the group consisting of an α-olefin represented by the formula $H_2C{=}CHR^{15}$ wherein $R^{15}$ is a $C_1$–$C_{18}$ linear, branched or cyclic alkyl group or a $C_6$–$C_{20}$ aryl group, a $C_3$–$C_{20}$ cyclic olefin, and $C_4$–$C_{20}$ linear, branched and cyclic dienes, and wherein the comonomer is present in an amount of not more than 1 mole %, based on the total number of moles of all monomer units constituting the ethylene polymer.

7. The ethylene polymer according to item 6 above, wherein the comonomer is selected from the group consisting of propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, vinylcyclohexane, cyclopentene, cycloheptene, norbornene, 5-methyl-2-norbornene, tetracyclododecene, 2-methyl-1.4, 5.8-dimethano-1,2,3,4,4a,5,8,8a-octahydronaphthalene, 1,3-butadiene, 1,4-pentadiene, 1,5-hexadiene, 1,4-hexadiene, and cyclohexadiene.

8. A method for producing a high density ethylene polymer of item 1 above, which comprises homopolymerizing ethylene or copolymerizing ethylene with at least one comonomer selected from the group consisting of an α-olefin, a cyclic olefin, and linear, branched and cyclic dienes, in the presence of a catalyst comprising the following components (A), (B) and (C):

(A) a transition metal compound represented by the formula (1)

$$R^1R^2R^3R^4M$$

wherein:

M represents a transition metal selected from the group consisting of zirconium, titanium and hafnium;

each of $R^1$ and $R^2$ independently represents:

an indenyl group which is unsubstituted or substituted with at least one substituent selected from the group consisting of a $C_1$–$C_{20}$ alkyl group, a $C_6$–$C_{20}$ aryl group, an aralkyl group having a $C_1$–$C_{20}$ alkyl group substituted with at least one $C_6$–$C_{20}$ aryl group, and an alkylaryl group having a $C_6$–$C_{20}$ aryl group substituted with at least one $C_1$–$C_{20}$ alkyl group; or a substituted cyclopentadienyl group having two or three substituents, wherein each substituent is independently selected from the group consisting of a $C_1$–$C_{20}$ alkyl group, a $C_6$–$C_{20}$ aryl group, an aralkyl group having a $C_1$–$C_{20}$ alkyl group substituted with at least one $C_6$–$C_{20}$ aryl group, and an alkylaryl group having a $C_6$–$C_{20}$ aryl group substituted with at least one $C_1$–$C_{20}$ alkyl group, with the proviso that each of the substituted indenyl group and the substituted cyclopentadienyl group independently and optionally has a substitution in which at least two positions thereof together are substituted with one multivalent group derived from a substituent selected from the substituents, that each alkyl group is independently of a linear, a branched or a cyclic configuration, that each of the substituted indenyl group and the substituted cyclopentadienyl group independently and optionally has at least one of the two or three substituents which is bonded thereto through an oxygen, a nitrogen, a sulfur or a phosphorus atom, and that at least one carbon atom of at least one of the substituents is optionally replaced by a silicon atom;

each of $R^3$ and $R^4$ independently represents a hydrogen atom, a halogen atom, a $C_1$–$C_{20}$ alkyl group, a $C_6$–$C_{20}$ aryl group, an aralkyl group having a $C_1$–$C_{20}$ alkyl group substituted with at least one $C_6$–$C_{20}$ aryl group, an alkylaryl group having a $C_6$–$C_{20}$ aryl group substituted with a $C_1$–$C_{20}$ alkyl group, or a —$SO_3R^5$ group wherein $R^5$ is a hydrocarbon group which is unsubstituted or substituted with at least one halogen atom, with the proviso that each alkyl group is independently of a linear, a branched or a cyclic configuration and that at least one carbon atom of at least one of the alkyl, aryl, aralkyl and alkylaryl groups is optionally replaced by a silicon atom; and each of $R^1$, $R^2$, $R^3$ and $R^4$ is bonded to the transition metal M;

(B) an inorganic solid component comprising a particulate inorganic solid (b-1) having hydroxyl groups on a surface thereof, and, carried thereon, an organoaluminumoxy compound (b-2) having repeating alkyloxyaluminum units each represented by the formula (5)

(5)

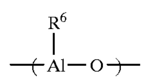

wherein $R^6$ represents a $C_1$–$C_{12}$ linear, branched or cyclic alkyl group; and (C) an organoaluminum compound.

9. The method according to item 8 above, wherein the component (C) is a compound represented by the following formula (6) or (7):

$$R_n^7AlX_{3-n} \quad (6)$$

wherein $R^7$ represents a $C_1$–$C_{12}$ linear, branched or cyclic alkyl group or a $C_6$–$C_{20}$ aryl group; X represents a halogen atom or a hydrogen atom; and n is an integer of from 1 to 3; or $$R_n^7AlY_{3-n} \quad (7)$$

wherein $R^7$ is as defined for formula (6); Y represents an —$OR^8$ group, an —$OSiR_3^9$ group, an —$AlR_2^{10}$ group, an —$NR_2^{11}$ group, an —$SiR_3^{12}$ group or an —$N(R^{13})AlR_2^{14}$ group, wherein each of $R^8$, $R^9$, $R^{10}$ and $R^{14}$ independently represents a $C_1$–$C_{12}$ alkyl group or a $C_6$–$C_{20}$ aryl group, $R^{11}$ represents a hydrogen group, a $C_1$–$C_{12}$ alkyl group, a $C_6$–$C_{20}$ aryl group or a silyl group which is unsubstituted or substituted with at least one $C_1$–$C_{12}$ alkyl group, and each of $R^{12}$ and $R^{13}$ independently represents a $C_1$–$C_{12}$ alkyl group, with the proviso that each alkyl group is independently of a linear, a branched or a cyclic configuration; and n is 1 or 2.

10. The method according to item 8 or 9 above, wherein, in the component (B), the particulate inorganic solid (b-1) having hydroxyl groups on the surface thereof is at least one member selected from the group consisting of $SiO_2$, $Al_2O_3$, MgO, $MgCl_2$, $ZrO_2$, $TiO_2$, $B_2O_3$, CaO, ZnO, BaO, $V_2O_5$, $Cr_2O_3$ and ThO.

11. The method according to item 8 or 9 above, wherein in the component (B), the particulate inorganic solid (b-1) having hydroxyl groups on the surface thereof is silica.

12. The method according to any one of items 8 to 11 above, wherein, in copolymerizing ethylene, ethylene is copolymerized with at least one comonomer selected from the group consisting of an α-olefin represented by the formula $H_2C{=}CHR^{15}$ wherein $R^{15}$ is a $C_1$–$C_{18}$ linear, branched or cyclic alkyl group or a $C_6$–$C_{20}$ aryl group, a $C_3$–$C_{20}$ cyclic olefin, and $C_4$–$C_{20}$ linear, branched and cyclic dienes, and wherein the comonomer is used in an amount of not more than 1 mole %, based on the total number of moles of the ethylene and the comonomer.

13. The method according to any one of items 8 to 12 above, wherein the components (B) and (C) are intimately mixed and contacted with each other to form an intimate mixture of components (B) and (C), and the intimate mixture and the component (A) are separately introduced into a system for homopolymerizing or copolymerizing ethylene, followed by polymerization.

14. The method according to any one of items 8 to 12 above, wherein the components (A) and (B) are intimately mixed and contacted with each other to form an intimate mixture of components (A) and (B), and the intimate mixture and the component (c) are separately introduced into a system for homopolymerizing or copolymerizing ethylene, followed by polymerization.

Hereinbelow, the high density ethylene polymer of the present invention is explained in detail.

The high density ethylene polymer of the present invention essentially comprises a homopolymer of ethylene, or a copolymer of ethylene with at least one comonomer selected from the group consisting of an α-olefin, a cyclic olefin, and linear, branched and cyclic dienes. More particularly, the high density ethylene polymer of the present invention comprises a homopolymer of ethylene, or a copolymer of ethylene with at least one comonomer selected from the group consisting of an α-olefin represented by the formula $H_2C{=}CHR^{15}$ wherein $R^{15}$ represents a $C_1$–$C_{18}$ linear, branched or cyclic alkyl group or a $C_6$–$C_{20}$ aryl group, a $C_3$–$C_{20}$ cyclic olefin and $C_4$–$C_{20}$ linear, branched and cyclic dienes.

When the high density ethylene polymer of the present invention is a copolymer of ethylene with at least one comonomer, the content of the comonomer units in the high density ethylene copolymer is preferably 1 mole % or less, more preferably 0.5 mole % or less, still more preferably 0.2 mole % or less, still more preferably 0.1 mole % or less, based on the total number of moles of all monomer units constituting the ethylene polymer. When the content of the comonomer units exceeds 1 mole %, the density of the ethylene copolymer is markedly lowered, so that practical problems, such as a lowering of stiffness, are likely to arise.

The high density ethylene polymer of the present invention has a density d ($g/cm^3$) of not lower than 0.951. When the density of the high density ethylene polymer is lower than 0.951 $g/cm^3$, practical problems arise, such that the polymer does not have a satisfactorily high stiffness. The high density ethylene polymer of the present invention, which has a density of not lower than 0.951 $g/cm^3$, exhibits a satisfactorily high stiffness from the practical viewpoint. The density of the high density ethylene polymer of the present invention is preferably not lower than 0.955 $g/cm^3$, more preferably not lower than 0.960 $g/cm^3$, still more preferably not lower than 0.965 $g/cm^3$.

On the other hand, the density of the high density ethylene polymer of the present invention is not higher than 0.980 $g/cm^3$. When the density of the high density ethylene polymer is higher than 0.980 $g/cm^3$, the polymer has an excessively high degree of crystallinity, so that the polymer is likely to suffer brittle fracture, which is practically disadvantageous. It is preferred that the density of the high density ethylene polymer of the present invention be not higher than 0.975 $g/cm^3$.

In the present invention, the density of an ethylene polymer is measured as follows. A polymer strand, which has been obtained in the operation of the measurement of the MFR of the ethylene polymer at 190° C. under a load of 2.16 kg, is heated at 120° C. for 1 hour and then, gradually cooled to room temperature. The cooled strand is subjected to a density measurement by means of a density-gradient tube.

The high density ethylene polymer of the present invention has an Izod impact strength of 1 kgf·cm/$cm^2$ or more, and satisfies the following relationship:

$$\log a_{kI} \geqq -0.844 \log M_I + 1.462$$

wherein $a_{kI}$ represents the Izod impact strength (kgf·cm/$cm^2$), and $M_I$ represents the melt flow rate as measured at 190° C. under a load of 2.16 kg.

It is preferred that the high density ethylene polymer of the present invention satisfies the following relationship:

$$\log a_{kI} \geqq -0.844 \log M_I + 1.575$$

wherein $a_{kI}$ and $M_I$ are as defined above.

It is more preferred that the high density ethylene polymer of the present invention satisfies the following relationship:

$$\log a_{kI} \geqq -0.844 \log M_I + 1.700$$

wherein $a_{kI}$ and $M_I$ are as defined above.

In general, when the $M_I$ of a polymer is increased, the polymer exhibits improved moldability, but the impact resistance of the polymer disadvantageously decreases. Therefore, when the $M_I$ of a polymer is increased for the purpose of improving the moldability thereof, it has conventionally been attempted to decrease the density of the polymer by, for example, copolymerization, so as to prevent a lowering of the impact resistance of the polymer. However, the decrease in the density of an ethylene polymer, in turn, causes a lowering of the stiffness of the ethylene polymer, so that the application of such a density-decreasing technique is practically limited. By contrast, the high density ethylene polymer of the present invention surprisingly exhibits a satisfactorily high impact strength in spite of its high density.

In the present invention, Izod impact strength $a_{kI}$ (kgf·cm/$cm^2$) is measured in accordance with JIS K 7110.

The high density ethylene polymer of the present invention has an $M_I$ (g/10 minutes) of more than 3 and not more than 100, wherein $M_I$ is defined as the MFR as measured at 190° C. under a load of 2.16 kg.

When the high density ethylene polymer has an $M_I$ of not more than 3, a marked lowering of the moldability thereof occurs, so that the ethylene polymer cannot be practically employed as a material for injection molding and the like. The high density ethylene polymer of the present invention has an $M_I$ of more than 3, so that it exhibits an excellent moldability. In a preferred embodiment of the present invention, the high density ethylene polymer has an $M_I$ of more than 5, more preferably more than 10.

Further, the high density ethylene polymer of the present invention has an $M_I$ of not more than 100. When the high density ethylene polymer has an $M_I$ of more than 100, the ethylene polymer has an extremely poor impact resistance and hence cannot be practically used. For obtaining a more improved impact resistance, it is preferred that the high density ethylene polymer has an $M_I$ of not more than 80, more preferably not more than 50, most preferably not more than 30.

The high density ethylene polymer of the present invention satisfies the following relationship:

$$\log M_{IR} \geqq -0.094 \log M_I + 1.520$$

wherein $M_I$ is as defined above, and $M_{IR}$ represents the $H_{MI}/M_I$ ratio in which $H_{MI}$ (g/10 minutes) is defined as the MFR as measured at 190° C. under a load of 21.6 kg and $M_I$ is as defined above.

By virtue of the $M_I$ and $M_{IR}$ which satisfy the above-mentioned relationship, the density of the high density ethylene polymer of the present invention can be satisfactorily high, so that improved mechanical properties, such as high stiffness, can be achieved.

In the present invention, when the high density ethylene polymer satisfies the following relationship:

$$\log M_{IR} \geqq -0.125 \log M_I + 1.574,$$

the ethylene polymer can achieve a further improvement in the mechanical properties thereof, such as stiffness. Further, when the high density ethylene polymer satisfies the following relationship:

$$\log M_{IR} \geqq -0.198 \log M_I + 1.698,$$

the ethylene polymer can achieve still a further improvement in the mechanical properties thereof.

In the present invention, $M_I$ and $H_{MI}$ are measured in accordance with the condition E and condition F of the ASTM D1238, respectively.

It is preferred that the high density ethylene polymer of the present invention has an $H_{MI}$ of not less than 90 and not more than 5,000. In the present invention, it is more preferred that the ethylene polymer have an $H_{MI}$ of not less than 140 and not more than 3,000.

Further, it is preferred that the high density ethylene polymer of the present invention has an $M_{IR}$ of not less than 25 and not more than 70. In the present invention, it is more preferred that the ethylene polymer has an $M_{IR}$ of not less than 28, still more preferably not less than 30, and it is more preferred that the ethylene copolymer has an $M_{IR}$ of not more than 50, still more preferably not more than 40.

In the high density ethylene polymer of the present invention, the density d ($g/cm^3$) and the $M_I$ (g/10 minutes) satisfy the following relationship:

$$d \geqq -0.00873 \log M_I + 0.972.$$

As mentioned above, in general, when the $M_I$ of a polymer is increased, the polymer exhibits an increased density and an improved moldability, but the impact resistance of the polymer is disadvantageously reduced. Therefore, when the $M_I$ of a polymer is increased for the purpose of improving the moldability thereof, it has conventionally been attempted to decrease the density of the polymer by, for example, copolymerization, so as to prevent a lowering of the impact resistance of the polymer. However, the decrease in the density of an ethylene polymer, in turn, causes a lowering of the stiffness of the ethylene polymer, so that the application of such a density-decreasing technique is practically limited. The high density ethylene polymer of the present invention has a high impact resistance as compared to the conventional high density ethylene polymers. Therefore, even when the $M_I$ of the high density ethylene polymer is increased, the high impact resistance remains satisfactory. There is no need for lowering the density of the ethylene polymer for achieving a satisfactory impact resistance. In addition, because the high density ethylene polymer of the present invention satisfies the above-mentioned relationship between the density and $M_I$, the ethylene polymer has an extremely good balance between various properties, such as stiffness, moldability and the like.

In a more preferred embodiment of the high density ethylene polymer of the present invention, the density d (g/cm$^3$) and the $M_I$ (g/10 minutes) satisfy the following relationship:

$$d \geqq -0.00873 \log M_I + 0.976.$$

It is preferred that the high density ethylene polymer of the present invention has an Mw of 10,000 or more, more preferably 30,000 or more, wherein Mw is defined as a weight average molecular weight measured by gel permeation chromatography (GPC) using a calibration curve obtained with respect to a standard polystyrenes. It is also preferred that the high density ethylene polymer has an Mw of not more than 500,000, more preferably not more than 300,000, still more preferably not more than 150,000, still more preferably not more than 100,000, most preferably not more than 80,000.

It is preferred that the high density ethylene polymer of the present invention has an Mw/Mn ratio of 5.0 or more, wherein Mw and Mn, respectively, represent the weight average molecular weight and the number average molecular weight, each measured by gel permeation chromatography (GPC) using a calibration curve obtained with respect to standard polystyrenes. An Mw/Mn ratio is generally used as a yardstick of molecular weight distribution. In general, the larger the Mw/Mn ratio, the broader the molecular weight distribution and the more improved the moldability. In the present invention, the Mw/Mn ratio is more preferably 5.5 or more, still more preferably 6.0 or more, most preferably 7.0 or more. On the other hand, in the present invention, the Mw/Mn ratio is preferably not more than 10.0. When the Mw/Mn ratio is too large, various disadvantages, such as a lowering of impact resistance, are likely to arise. In the present invention, the Mw/Mn ratio is more preferably not more than 9.5, still more preferably not more than 9.0.

Hereinbelow, the molecular weight distribution of the high density ethylene polymer of the present invention will be described in detail.

In general, a molecular weight distribution curve of an ethylene polymer can be approximated by a Gaussian distribution curve. By using a computer, an optimized approximation of the molecular weight distribution curve can be achieved within a relatively short period of time. The approximation can be achieved using a single Gaussian distribution curve. However, in some cases, the precision of the approximation may be improved by overlapping a plurality of Gaussian distribution curves. When the molecular weight distribution curve is approximated by overlapping a plurality of Gaussian distribution curves, the plurality of Gaussian distribution curves may be regarded as being curves obtained by the resolution of the molecular weight distribution curve. Further, when the molecular weight distribution curve is resolved into a plurality of Gaussian distribution curves as mentioned above, the ethylene polymer may be regarded as being composed of a plurality of components respectively corresponding to the plurality of Gaussian distribution curves. In approximating the molecular weight distribution curve by the overlapping of a plurality of Gaussian distribution curves by using a computer, the results of the computer calculation for the optimization of the approximation may vary depending on the initial values set for the calculation and, hence, there is a defect such that the calculation is affected by arbitrariness to some extent. Nevertheless, this method is an effective method for approximately determining the shape of distribution curve showing the molecular weight distribution.

When the molecular weight distribution curve of the high density ethylene polymer of the present invention is approximated by the above-mentioned technique using a plurality of Graussian distribution curves, the approximation can be performed by using at least two Gaussian distribution curves. It is recommended to use three Gaussian distribution curves in the approximation of the molecular weight distribution. In the present invention, when the molecular weight distribution curve is approximated by using three Gaussian distribution curves, the area of a peak having a maximum peak area is represented by Sm. When one or more peaks are present on the high molecular weight side relative to the peak having a maximum peak area, the total of the one or more peaks on the high molecular weight side relative to the peak having a maximum peak area is represented by Sh. When one or more peaks are present on the low molecular weight side relative to the peak having a maximum peak area, the total area of the one or more peaks on the low molecular weight side relative to the peak having a maximum peak area is represented by Sl. In the present invention, either Sh or Sl can be 0.

In approximating the molecular weight distribution curve by using three Gaussian distribution curves as mentioned above, the three Gaussian distribution curves may be established so that Sm, Sh and Sl satisfy the following relationships. That is, it is preferred that the ratio of Sh to Sm, i.e., Sh/Sm ratio, be less than 1, more preferably ⅔ or less, still more preferably ½ or less, still more preferably ⅓ or less, still more preferably ⅕ or less, most preferably ⅒ or less. Further, it is preferred that the ratio of Sl to Sm, i.e., Sl/Sm ratio, be less than 1, more preferably ⅔ or less, still more preferably ½ or less, still more preferably ⅓ or less, still more preferably ⅕ or less, most preferably ⅒ or less.

The molecular weight distribution curves can be easily obtained by gel permeation chromatography (GPC) by using, for example, 150-C ALC/GPC, manufactured and sold by Waters Assoc. Co., USA.

The high density ethylene polymer of the present invention may have a critical shear stress of $4\times10^6$ dyn/cm$^2$ or less, in terms of the minimum shear stress at which a gross melt fracture occurs.

The term "gross melt fracture" means a state such that a polymer strand produced in the measurement of MFR suffers a vigorous melt fracture which adversely affects all portions (not only the surface) of the strand, thus causing a volumetric change in the entire body of the strand. With respect to the critical shear stress in terms of the minimum shear stress at which a gross melt fracture occurs, reference can be made to, for example, International Patent Application Publication No. WO 93/08221.

In the high density ethylene polymer of the present invention, the critical shear rate in terms of the minimum shear rate at which a surface melt fracture occurs is not larger than 1.5 times that of a conventional high density ethylene polymer having the same $M_I$ and Mw/Mn as those of the high density ethylene polymer of the present invention.

The high density ethylene polymer of the present invention can be produced, for example, by polymerizing ethylene or ethylene and a comonomer in the presence of an olefin polymerization catalyst comprising components (A), (B) and (C) described below.

Thus, in another aspect of the present invention, there is provided a method for producing a high density ethylene polymer of item 1 or 2 above, which comprises homopolymerizing ethylene or copolymerizing ethylene with at least one comonomer selected from the group consisting of an α-olefin, a cyclic olefin, and linear, branched and cyclic dienes, in the presence of a catalyst comprising the following components (A), (B) and (C):

(A) a transition metal compound represented by the formula (1)

$$R^1R^2R^3R^4M$$

wherein:

M represents a transition metal selected from the group consisting of zirconium, titanium and hafnium;

each of $R^1$ and $R^2$ independently represents:

an indenyl group which is unsubstituted or substituted with at least one substituent selected from the group consisting of a $C_1$–$C_{20}$ alkyl group, a $C_6$–$C_{20}$ aryl group, an aralkyl group having a $C_1$–$C_{20}$ alkyl group substituted with at least one $C_6$–$C_{20}$ aryl group, and an alkylaryl group having a $C_6$–$C_{20}$ aryl group substituted with at least one $C_1$–$C_{20}$ alkyl group; or a substituted cyclopentadienyl group having two or three substituents, wherein each substituent is independently selected from the group consisting of a $C_1$–$C_{20}$ alkyl group, a $C_6$–$C_{20}$ aryl group, an aralkyl group having a $C_1$–$C_{20}$ alkyl group substituted with at least one $C_6$–$C_{20}$ aryl group, and an alkylaryl group having a $C_6$–$C_{20}$ aryl group substituted with at least one $C_1$–$C_{20}$ alkyl group, with the proviso that each of the substituted indenyl group and the substituted cyclopentadienyl group independently and optionally has a substitution in which at least two positions thereof together are substituted with one multivalent group derived from a substituent selected from the above-mentioned substituents, that each alkyl group is independently of a linear, a branched or a cyclic configuration, that each of the substituted indenyl group and the substituted cyclopentadienyl group independently and optionally has at least one of the two or three substituents which is bonded thereto through an oxygen, a nitrogen, a sulfur or a phosphorus atom, and that at least one carbon atom of at least one of the substituents is optionally replaced by a silicon atom;

each of $R^3$ and $R^4$ independently represents a hydrogen atom, a halogen atom, a $C_1$–$C_{20}$ alkyl group, a $C_6$–$C_{20}$ aryl group, an aralkyl group having a $C_1$–$C_{20}$ alkyl group substituted with at least one $C_6$–$C_{20}$ aryl group, an alkylaryl group having a $C_6$–$C_{20}$ aryl group substituted with a $C_1$–$C_{20}$ alkyl group, or a —$SO_3R^5$ group wherein $R^5$ is a hydrocarbon group which is unsubstituted or substituted with at least one halogen atom, with the proviso that each alkyl group is independently of a linear, a branched or a cyclic configuration and that at least one carbon atom of at least one of the alkyl, aryl, aralkyl and alkylaryl groups is optionally replaced by a silicon atom; and each of $R^1$, $R^2$, $R^3$ and $R^4$ is bonded to the transition metal M;

(B) an inorganic solid component comprising a particulate inorganic solid (b-1) having hydroxyl groups on a surface thereof and, carried thereon, an organoaluminumoxy compound (b-2) having repeating alkyloxyaluminum units each represented by the formula (5)

(5)

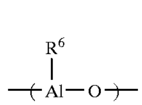

wherein $R^6$ represents a $C_1$–$C_{12}$ linear, branched or cyclic alkyl group; and (C) an organoaluminum compound.

In the present invention, by using the above-mentioned olefin polymerization catalyst comprising the above-mentioned specific transition metal compound, it has become possible to obtain the high density ethylene polymer of the present invention, which has various excellent properties as mentioned above. This is completely unexpected from conventionally known techniques, and very surprising. The reason why such a high density ethylene polymer having excellent properties can be obtained by the use of the above-mentioned catalyst has not yet been elucidated. However, the present inventors consider that the reason for this is as follows. The so-called "metallocene catalyst" is also called a "single site catalyst". The single site catalyst has a single active species (the term "active species" means the type of a site which exhibits a catalytic activity, namely, an active site of the catalyst.). It has conventionally been known that, when the polymerization is conducted using such a conventional metallocene catalyst, the resultant polymer has a very narrow molecular weight distribution. However, by use of the above-mentioned catalyst comprising the specific transition metal compound (A), it has unexpectedly become possible to obtain a polymer having a molecular weight distribution which is broader than that of the polymer obtained using a conventional metallocene catalyst. This is presumed to be ascribed to the characteristic features of the above-mentioned catalyst, wherein the transition metal compound (A) can have at least two stereoisomeric configurations, and that the catalyst further comprises the inorganic solid component (B) and the organoaluminum compound (C). It is presumed that, due to this slightly broader molecular weight distribution, a good balance of the properties of the high density ethylene polymer, such as impact resistance, stiffness and moldability have been successfully achieved. However, as mentioned above, the specific reasons for this have not yet been elucidated.

Hereinbelow, detailed explanation is made on a method for producing the high density ethylene polymer of the present invention.

The term "polymerization" used herein frequently means not only homopolymerization but also copolymerization, and the term "polymer" used herein frequently means not only a homopolymer but also a copolymer. The term "polymerization" used herein is not intended to include a preliminary polymerization [(i.e., prepolymerization) which is conventionally carried out, prior to a polymerization for obtaining a final polymer, for the purpose of, for example, controlling the particle size or powder characteristics of a polymer, or alleviating a reduction in catalyst activity], but means only a full polymerization which is carried out for producing a polymer as a final product. The full polymerization is carried out under reaction conditions, including a reaction temperature and a reaction pressure, which are preferred from the commercial and economical points of view. Such a reaction temperature is generally 50° C. or more, preferably 60° C. or more, and such a reaction pressure is generally 2 kg/cm$^2$ or more, preferably 5 kg/cm$^2$ or more.

In the catalyst used in the method of the present invention for producing a high density ethylene polymer, component (A) represented by formula (1) may have a halogen atom as a substituent. Examples of such a halogen atom include fluorine, chlorine, bromine and iodine.

In the ligand represented by the formula —$SO_3R^5$ which is an example of a substituent in component (A) of formula (1), $R^5$ is a $C_1$–$C_8$ hydrocarbon group, preferably a $C_1$–$C_8$ linear, branched or cyclic alkyl group or a $C_6$–$C_8$ aryl group, which is unsubstituted or substituted with at least one halogen atom. Specific examples of ligands represented by the formula —$SO_3R^5$ include a p-toluenesulfonato group, a methanesulfonato group, a trifluoromethanesulfonato group and the like.

It is preferred that the transition metal compound used as component (A) can assume two or more stereoisomeric configurations.

It is preferred that each of $R^3$ and $R^4$ be independly an alkyl group, an aryl group, a halogen atom or the like.

Examples of transition metal compounds of formula (1), wherein M represents zirconium, include:
bis(indenyl)zirconium dichloride,
bis(methylindenyl)zirconium dichloride,
bis(ethylindenyl)zirconium dichloride,
bis(propylindenyl)zirconium dichloride,
bis(butylindenyl)zirconium dichloride,
bis(pentylindenyl)zirconium dichloride,
bis(hexylindenyl)zirconium dichloride,
bis(octylindenyl)zirconium dichloride,
bis(phenylindenyl)zirconium dichloride,
bis(methylphenylindenyl)zirconium dichloride,
bis(ethylphenylindenyl)zirconium dichloride,
bis(naphthylindenyl)zirconium dichloride,
bis(methylnaphthylindenyl)zirconium dichloride,
bis(dimethylindenyl)zirconium dichloride,
bis(dimethylpropylindenyl)zirconium dichloride,
bis(methylethylindenyl)zirconium dichloride,
bis(methylphenylindenyl)zirconium dichloride,
bis(dimethylphenylindenyl)zirconium dichloride,
bis(tolylindenyl)zirconium dichloride,
bis(methyltolylindenyl)zirconium dichloride,
bis(indenyl)zirconium dibromide,
bis(indenyl)zirconium bis(p-toluenesulfonato),
bis(4,5,6,7-tetrahydroindenyl)zirconium dichloride,
bis(benzoindenyl)zirconium dichloride,
bis(methylbenzoindenyl)zirconium dichloride,
bis(dimethylbenzoindenyl)zirconium dichloride,
bis(dimethylcyclopentadienyl)zirconium dichloride,
bis(dimethylcyclopentadienyl)zirconium ethoxychloride,
bis(dimethylcyclopentadienyl)zirconium bis(trifluoromethanesulfonato),
bis(methylethylcyclopentadienyl)zirconium dichloride,
bis(methylpropylcyclopentadienyl)zirconium dichloride,
bis(methylbutylcyclopentadienyl)zirconium dichloride,
bis(methylbutylcyclopentadienyl)zirconium bis(methanesulfonato),
bis(trimethylcyclopentadienyl)zirconium dichloride,
bis(tetramethylcyclopentadienyl)zirconium dichloride,
bis(pentamethylcyclopentadienyl)zirconium dichloride,
bis(hexylcyclopentadienyl)zirconium dichloride,
bis(trimethylsilylcyclopentadienyl)zirconium dichloride,
bis(methylphenylcyclopentadienyl)zirconium dichloride,
bis(ethylphenylcyclopentadienyl)zirconium dichloride,
bis(methyltolylcyclopentadienyl)zirconium dichloride, and
bis(ethyltolylcyclopentadienyl)zirconium dichloride.

When the above-mentioned transition metal compound has a substituent bonded to the cyclopentadienyl or indenyl ring, the substituent can be bonded to the ring at an arbitrary position thereof. For example, a di-substituted cyclopentadienyl ring having two substituents bonded to the ring may be of a 1,2-substituted or a 1,3-substituted configuration, and a tri-substituted cyclopentadienyl ring having three substituents bonded to the ring may be of a 1,2,3-substituted or a 1,2,4-substituted configuration.

Further, alkyl groups, such as a propyl group or a butyl group, include isomers thereof, such as n-, iso-, sec- and tert-isomers thereof.

In the present invention, those transition metal compounds, which have the same structures as those of the above-mentioned zirconium compounds of formula (1) except that the zirconium is replaced by titanium or hafnium, can also be employed.

With respect to component (B) of the catalyst used in the present invention, it is preferred that particulate inorganic solid (b-1) having hydroxyl groups on the surface thereof [hereinbelow, frequently referred to simply as "particulate inorganic solid (b-1)" or "component (b-1)"] have a pore volume (PV: cm$^3$/g) of from 0.4 to 1.4 cm$^3$/g and a specific surface area (SA: m$^2$/g) of from 150 to 800 m$^2$/g, with the proviso that the pore volume (PV: cm$^3$/g) and the specific surface area (SA: m$^2$/g) satisfy the following relationship.

$$SA \leqq -625 \times PV + 1100 \tag{2}$$

As mentioned above, in the catalyst used in the present invention, it is preferred that the particulate inorganic solid (b-1) have a pore volume (PV: cm$^3$/g) of from 0.4 to 1.4 cm$^3$/g.

When the pore volume of the particulate inorganic solid (b-1) is less than 0.4 cm$^3$/g, the amount of an organoaluminumoxy compound carried on particulate inorganic solid (b-1) becomes very small so that the resultant catalyst cannot exhibit a satisfactorily high polymerization activity. Therefore, in the present invention, the pore volume of the particulate inorganic solid (b-1) is generally not less than 0.4 cm$^3$/g, preferably not less than 0.5 cm$^3$/g, more preferably not less than 0.6 cm$^3$/g.

When the pore volume of the particulate inorganic solid (b-1) is more than 1.4 cm$^3$/g, the total volume of voids in particulate inorganic solid (b-1) becomes very large, so that it becomes difficult to obtain a particulate inorganic solid having satisfactorily high mechanical strength. In this case, the particulate inorganic solid is likely to be broken into dust during the polymerization, so that the resultant polymer contains dust formed from the breakage of the particulate inorganic solid. As a result, various disadvantages are likely to be caused such that the powder characteristics of the polymer become poor, and that the bulk density of the polymer becomes low. Therefore, in the present invention, the pore volume of the particulate inorganic solid (b-1) is generally not more than 1.4 $cm^3/g$, preferably not more than 1.2 $cm^3/g$, more preferably not more than 1.1 $cm^3/g$, most preferably not more than 1.0 $cm^3/g$.

In the present invention, it is preferred that the particulate inorganic solid (b-1) has a specific surface area (SA: $m^2/g$) of from 150 to 800 $m^2/g$.

When the specific surface area of the particulate inorganic solid (b-1) is less than 150 $m^2/g$, the amount of an organoaluminumoxy compound carried on the particulate inorganic solid (b-1), per unit weight of the particulate inorganic solid (b-1), becomes very small, so that the polymerization activity per unit weight of the particulate inorganic solid is likely to become low. Therefore, in the present invention, the specific surface area of the particulate inorganic solid (b-1) is generally not less than 150 $m^2/g$, preferably not less than 200 $m^2/g$, more preferably not less than 250 $m^2/g$.

When the specific surface area of the particulate inorganic solid (b-1) is more than 800 $m^2/g$, it becomes difficult to perform a uniform polymerization reaction over the entire surface of the catalyst. In this case, it is likely that a vigorous polymerization reaction locally occurs in the surface of the catalyst. As a result, various disadvantages are likely to be caused, such that the powder characteristics of the resultant polymer become poor, and that the bulk density of the polymer becomes low. Therefore, in the present invention, the specific surface area of particulate inorganic solid (b-1) is generally not more than 800 $m^2/g$, preferably not more than 700 $m^2/g$, more preferably not more than 600 $m^2/g$.

Further, in the present invention, it is preferred that the particulate inorganic solid (b-1) has a pore volume (PV: $cm^3/g$) and a specific surface area (SA: $m^2/g$) within the above-mentioned respective ranges, with the proviso that the pore volume (PV: $cm^3/g$) and the specific surface area (SA: $m^2/g$) satisfy the following relationship.

$$SA \leqq -625 \times PV + 1100 \quad (2)$$

For example, in the case of particulate silica having a pore volume (PV: $cm^3/g$) of 1.0 $cm^3/g$ and a specific surface area (SA: $m^2/g$) of 300 $m^2/g$, the value of the right side of formula (2) is 475, and the value of the left side of formula (2) is 300. Therefore, the pore volume and specific surface area of this particulate silica satisfy the relationship of formula (2).

When the pore volume (PV: $cm^3/g$) and the specific surface area (SA: $m^2/g$) of the silica do not satisfy the relationship of formula (2), it is likely that the silica suffers fine cracking. The cracks continue to grow during the polymerization, leading to a breakage of the silica, so that the resultant polymer contains dust formed from the breakage of the silica. As a result, various disadvantages are likely to be caused, such that the powder characteristics of the polymer are lowered to a commercially undesirable level and, in some cases, the bulk density of the polymer becomes considerably low.

Therefore, when particulate silica is used as the particulate inorganic solid (b-1) of the catalyst used in the present invention, it is preferred that the pore volume (PV: $cm^3/g$) and the specific surface area (SA: $m^2/g$) of the silica satisfy the relationship of formula (2), more preferably the relationship of the following formula (3):

$$SA \leqq -625 \times PV + 1000 \quad (3).$$

As mentioned above, particulate inorganic solid (b-1) of the catalyst used in the present invention has hydroxyl groups on the surface thereof.

In the present invention, the hydroxyl groups on the surface of the particulate inorganic solid (b-1) are OH groups which are strongly bonded to the surface of the particulate inorganic solid even under polymerization conditions, and which, when heated at high temperatures, react with one another to generate $H_2O$. Such hydroxyl groups are not simply adsorbed onto the surface of the particulate inorganic solid (b-1) but are chemically bonded to the surface matrix of the particulate inorganic solid (b-1). For example, when silica having hydroxyl groups on the surface thereof is used as particulate inorganic solid (b-1), it is considered that each hydroxyl group forms an Si—OH bond with a silicon atom of the silica. The hydroxyl group having such a chemical bond is not easily liberated from the silica, even when, for example, contacted with an inert solvent.

In the present invention, the hydroxyl group content of the particulate inorganic solid (b-1) is determined by subjecting the particulate inorganic solid to heat treatment at 1000° C. under atmospheric pressure. The hydroxyl group content of particulate inorganic solid (b-1) is determined as a ratio (% by weight) of the weight decrease of the particulate inorganic solid which is caused by the heat treatment, relative to the weight of the particulate inorganic solid before the heat treatment.

In the present invention, it is preferred that the hydroxyl group content of the particulate inorganic solid (b-1) be sufficient for bonding the organoaluminumoxy compound (b-2) having alkyl groups to the particulate inorganic solid (b-1). When the hydroxyl group content is too large relative to the amount of the organoaluminumoxy compound (b-2), the alkyl groups in the organoaluminumoxy compound (b-2) are destroyed by the hydroxyl groups, so that the resultant catalyst cannot exhibit a satisfactory catalytic activity. When the hydroxyl group content is too small, the bonding of the organoaluminumoxy compound to the particulate inorganic solid cannot be effectively performed. With respect to the mechanism of the bonding between the particulate inorganic solid (b-1) and the organoaluminumoxy compound (b-2), it is considered that a hydroxyl group on the particulate inorganic solid (b-1) reacts with an alkyl group in the organoaluminumoxy compound (b-2) to form an O—Al bond, thereby performing the bond between (b-1) and (b-2). For example, when silica as the particulate inorganic solid (b-1) is contacted with methylaluminoxane as the organoaluminumoxy compound (b-2), the generation of methane gas is observed. The reason for the generation of methane gas can be explained as follows. A methyl group in methylaluminoxane reacts with a hydroxyl group (OH group) on the surface of the silica, to thereby form an O—Al bond and methane ($CH_4$) which is released in a gaseous form. Therefore, when the hydroxyl group content of the particulate inorganic solid (b-1) is too small relative to the amount of organoaluminumoxy compound (b-2), the number of O—Al bonds formed by the reaction of a hydroxyl group on the particulate inorganic solid (b-1) with an alkyl group in the organoaluminumoxy compound (b-2) also becomes too small, so that it becomes difficult to strongly bond a desired amount of the organoaluminumoxy compound (b-2) to the particulate inorganic solid (b-1). In the present invention, the molar ratio ($OH/Al_{b-2}$) of a hydroxyl group (OH group) on the surface of the particulate inorganic solid (b-1) to aluminum ($Al_{b-2}$) in organoaluminumoxy compound (b-2) is preferably in the range of from 0.01 to 1, more preferably from 0.05 to 0.7.

For bonding the organoaluminumoxy compound (b-2) to the particulate inorganic solid (b-1) in a necessary and effective amount for polymerization, the hydroxyl group content of the particulate inorganic solid (b-1) is preferably not less than 0.5% by weight, more preferably not less than 1% by weight. However, when the hydroxyl group content of the particulate inorganic solid (b-1) is too large, the polymerization activity of the resultant catalyst is likely to become low. The reason for this has not been elucidated yet, but is considered to be as follows. When the hydroxyl group content is too large, the sites for reaction with the alkyl groups in the organoaluminumoxy compound (b-2) are caused to be excessively present on the surface of the particulate inorganic solid (b-1), so that the effect of the organoaluminumoxy compound as an auxiliary catalyst for the polymerization is lowered. That is, when the hydroxyl group content on the surface of the particulate inorganic solid (b-1) is too large, the polymerization activity of the resultant catalyst is likely to be lowered. Therefore, in the present invention, the upper limit of the hydroxyl group content is preferably 15% by weight, more preferably 12% by weight, most preferably 10% by weight.

In the present invention, the hydroxyl group content of the particulate inorganic solid (b-1) can be adjusted to a predetermined level within the range of from 0.5 to 15% by weight, by subjecting a particulate inorganic solid having hydroxyl groups on the surface thereof to heat treatment at an appropriate temperature. This heat treatment is advantageously employed when the hydroxyl group content of component (b-1) is more than 15% by weight, or when it is desired to further lower the hydroxyl group content of component (b-1) having a hydroxyl group content of less than 15% by weight. The heat treatment for adjusting the hydroxyl group content of particulate inorganic solid (b-1) is conducted preferably at 150° C. or more, more preferably 200° C. or more, and preferably 1000° C. or less, more preferably 800° C. or less.

In the present invention, also by contacting a particulate inorganic solid (b-1) having hydroxyl groups on the surface thereof with an organoaluminum compound, a particulate inorganic solid (b-1) having a hydroxyl group content adjusted to a predetermined level can be obtained. With respect to the temperature at which a particulate inorganic solid (b-1) having hydroxyl groups on the surface thereof is contacted with an organoaluminum compound, there is no particular limitation. However, it is preferred that the contact be conducted at room temperature or at an elevated temperature of 100° C. or less. The reason why the adjustment of the hydroxyl group content of a particulate inorganic solid (b-1) can be performed by contacting the particulate inorganic solid (b-1) with an organoaluminum compound is believed to reside in that the hydroxyl groups react with the organoaluminum compound, so that the hydroxyl groups are rendered chemically inactive.

In the present invention, the use of an organoaluminum compound also has an advantage in that the amount of the organoaluminumoxy compound (b-2) to be used can be reduced.

An example of the organoaluminum compounds which can be used in the present invention is one which is represented by the following formula (4):

$$R^5{}_nAlX_{3-n} \quad (4)$$

wherein $R^5$ represents a $C_1$–$C_{12}$ linear, branched or cyclic alkyl group or a $C_6$–$C_{20}$ aryl group; X represents a halogen atom or a hydrogen atom; and n is an integer of from 1 to 3.

Examples of $R^5$ in formula (4) include a methyl group, an ethyl group, an n-propyl group, an isopropyl group, an isobutyl group, a pentyl group, a hexyl group, an octyl group, a cyclopentyl group, a cyclohexyl group, a phenyl group and a tolyl group.

Specific examples of organoaluminum compounds defined above include a trialkylaluminum, such as trimethylaluminum, triethylaluminum, triisopropylaluminum, triisobutylaluminum, trioctylaluminum, or tri 2-ethylhexylaluminum; an alkenylaluminum, such as isoprenylaluminum; a dialkylaluminum halide, such as dimethylaluminum chloride, diethylaluminum chloride, diisopropylaluminum chloride, diisobutylaluminum chloride, or dimethylaluminum bromide; an alkylaluminum sesquihalide, such as methylaluminum sesquichloride, ethylaluminum sesquichloride, isopropylaluminum sesquichloride, butylaluminum sesquichloride, or ethylaluminum sesquibromide; an alkylaluminum dihalide, such as methylaluminum dichloride, ethylaluminum dichloride, isopropylaluminum dichloride, and ethylaluminum dibromide; and a dialkylaluminum hydride, such as diethylaluminum hydride, or diisobutylaluminum hydride.

In the present invention, when an organoaluminum compound is used for adjusting the hydroxyl group content of the surface of a particulate inorganic solid (b-1) to a predetermined level, the amount of the organoaluminum compound to be used is such as would provide an $Al_R$/OH molar ratio of 1 or less, wherein $Al_R$ is the amount of the aluminum contained in the organoaluminum compound and OH is the amount of the hydroxyl groups on the surface of the particulate inorganic solid.

In the present invention, when an organoaluminum compound is used for adjusting the hydroxyl group content of the surface of a particulate inorganic solid (b-1) to a predetermined level, the adjustment is usually conducted by contacting the particulate inorganic solid (b-1) with the organoaluminum compound. The resultant particulate inorganic solid (b-1) having the hydroxy group content adjusted to a predetermined level is contacted with the organoaluminumoxy compound (b-2), thereby bonding the organoaluminumoxy compound (b-2) to the particulate inorganic solid (b-1). Alternatively, the adjustment can be conducted by contacting a particulate inorganic solid (b-1) with a mixture of organoaluminumoxy compound (b-2) and the organoaluminum compound, so that the bonding of the organoaluminumoxy compound (b-2) to the particulate inorganic solid (b-1) can be conducted, simultaneously with the adjustment of the hydroxyl group content of the particulate inorganic solid (b-1).

As mentioned above, when the adjustment of the hydroxyl group content of the particulate inorganic solid (b-1) is performed by heating without using an organoaluminum compound, the molar ratio ($OH/Al_{b-2}$) of a hydroxyl group (OH group) on the surface of the particulate inorganic solid (b-1) to aluminum ($Al_{b-2}$) in organolauminumoxy compound (b-2) is preferably in the range of from 0.01 to 1, more preferably from 0.05 to 0.7. When the organoaluminum compound is used in adjusting the hydroxyl group content of the surface of a particulate inorganic solid to a predetermined level, the sum of the molar amount of aluminum ($Al_{b-2}$) in organoaluminumoxy compound (b-2) and the molar amount of aluminum ($Al_R$) in the organoaluminum compound is taken as the molar amount of $Al_{b-2}$ in calculating the molar ratio ($OH/Al_{b-2}$) of the hydroxyl groups (OH) on the surface of the particulate inorganic solid to the aluminum ($Al_{b-2}$) in organoaluminumoxy compound (b-2). Accordingly, in the present invention, when the organoaluminum compound is used in adjusting the hydroxyl group content of the surface of a particulate inorganic solid to a predetermined level, with respect to the molar ratio [$OH/(Al_{b-2}+Al_R)$] of the hydroxyl groups (OH) on the surface of the particulate inorganic solid to the sum of the molar amount of aluminum ($Al_{b-2}$) in organoaluminumoxy compound (b-2) and the molar amount of aluminum ($Al_R$) in the organoaluminum compound, the upper limit is preferably 1, more preferably 0.7, and the lower limit is preferably 0.01, more preferably 0.05.

In the present invention, when an organoaluminum compound is used for adjusting the hydroxyl group content of the surface of a particulate inorganic solid to a predetermined level, the molar ratio ($Al_R/Al_{b-2}$) of the aluminum ($Al_R$) in the organoaluminum compound to the aluminum ($Al_{b-2}$) in organoaluminumoxy compound (b-2) is preferably 1 or less.

As described above, in the present invention, it is preferred that, the particulate inorganic solid (b-1) having hydroxyl groups on the surface thereof has a pore volume (PV: $cm^3/g$) of from 0.4 to 1.4 $cm^3/g$ and a specific surface area (SA: $m^2/g$) of from 150 to 800 $m^2/g$, with the proviso that the pore volume (PV: $cm^3/g$) and the specific surface area (SA: $m^2/g$) satisfy the relationship represented by the formula (2).

$$SA \leqq -625 \times PV + 1100 \quad (2)$$

By using a particulate inorganic solid (b-1) satisfying the above conditions, an organoaluminumoxy compound (b-2) can be especially strongly bonded to the particulate inorganic solid (b-1), and a polymer containing no very fine particles and exhibiting excellent powder characteristics and a high bulk density can be very effectively produced without conducting a preliminary polymerization.

As a material for the particulate inorganic solid (b-1), a particulate inorganic porous material is preferred. Examples of main components of particulate inorganic porous materials include oxides, such as $SiO_2$, $Al_2O_3$, MgO, $MgCl_2$, $ZrO_2$, $TiO_2$, $B_2O_3$, CaO, ZnO, BaO, $V_2O_5$, $Cr_2O_3$, and ThO. These oxides are used individually or in mixture thereof, or in the form of a composite oxide thereof. Examples of such composite oxides include $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO. It is preferred that the main component of the material for the particulate inorganic solid (b-1) be at least one compound selected from the group consisting of $SiO_2$, $Al_2O_3$, MgO and $MgCl_2$.

In the present invention, among the above-mentioned examples of materials for the particulate inorganic solid (b-1), a particulate silica composed mainly of $SiO_2$ is especially preferred.

With respect to a method for preparing such a particulate silica, there is no particular limitation, but a sol-gel process is preferred. In the present invention, the term "sol-gel process" means a process in which solation and gelation are conducted to obtain a particulate silica. The sol-gel process comprises, for example, reacting a solution of sodium silicate with sulfuric acid to form silicic acid, subjecting the formed silicic acid to polycondensation to thereby form a silicate polymer in the form of a colloidal silica (silica hydrosol), subjecting the obtained silica hydrosol to gelation to thereby obtain a silica hydrogel, and drying the silica hydrogel to thereby produce a silica xerogel. By combining such a sol-gel process with another process, such as a hydrothermal process, various properties of a particulate silica, such as a pore volume, a specific surface area, a particle morphology and a particle size, can be controlled relatively easily. It is also possible to control the chemical properties of the particulate silica by incorporating therein elements other than silicon, such as aluminum and titanium, in the form of individual oxides thereof. Therefore, in the present invention, a particulate silica may contain such additives, that is, aluminum oxide, titanium oxide and the like.

In the present invention, with respect to the shape of the particulate inorganic solid (b-1), there is no particular limitation, but a spherical shape is preferred. In the present invention, the term "spherical shape" means a shape which has no edges and is close to a sphere as a whole.

In the present invention, the average particle diameter of the particulate inorganic solid (b-1) is 5 $\mu$m or more, preferably 10 $\mu$m or more, and 200 $\mu$m or less, preferably 100 $\mu$m or less.

A particulate silica having such a spherical shape and such an average particle diameter can be obtained easily by the above-mentioned sol-gel process.

In the present invention, the organoaluminumoxy compound (b-2) [hereinbelow, frequently referred to simply as "component (b-2)"] is an aluminoxane having repeating alkylaluminumoxy units each represented by the formula (5)

(5)

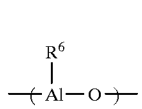

wherein $R^6$ represents a $C_1$–$C_{12}$ linear, branched or cyclic alkyl group.

Representative examples of $R^6$ in the formula (5) include a methyl group, an ethyl group, an n-propyl group, an isopropyl group, an n-butyl group, an isobutyl group, a pentyl group, a hexyl group, an octyl group, a decyl group, a cyclohexyl group and a cyclooctyl group. Among these, a methyl group and an ethyl group are preferred, and a methyl group is especially preferred. Representative examples of organoaluminumoxy compounds having repeating alkylaluminumoxy units of a single type represented by the formula (5) include methylaluminoxane, ethylaluminoxane, n-propylaluminoxane, isopropylaluminoxane, n-butylaluminoxane, isobutylaluminoxane, pentylaluminoxane, hexylaluminoxane, octylaluminoxane, decylaluminoxane, cyclohexylaluminoxane and cyclooctylaluminoxane. Among these, methylaluminoxane, ethylaluminoxane and isobutylaluminoxane are preferred, and methylaluminoxane is especially preferred. In the present invention, the organoaluminumoxy compound having repeating alkylaluminumoxy units each represented by the formula (5) is not limited to an organoaluminumoxy compound having repeating alkylaluminumoxy units of one type represented by the formula (5), but may have two or more different types of repeating alkylaluminumoxy units each represented by the formula (5). Examples of such organoaluminumoxy compounds having two or more different types of repeating alkylaluminumoxy units each represented by the formula (5) include ethylmethylaluminoxane, methylpropylaluminoxane and butylmethylaluminoxane. The respective proportions of individual types of repeating alkylaluminumoxy units in such an organoaluminumoxy compound can be arbitrarily selected between 0% and 100%. A plurality of types of organoaluminumoxy compounds each having repeating alkylaluminumoxy units of a single type each represented by the formula (5), may be used in combination. Examples of such combinations include a mixture of methylaluminoxane and ethylaluminoxane, a mixture of methylaluminoxane and n-propylaluminoxane, and a mixture of methylaluminoxane and isobutylaluminoxane.

The degree of polymerization of an aluminoxane is generally from 2 to 100, preferably from 4 to 40.

In the present invention, the organoaluminumoxy compound (b-2) to be used as an auxiliary catalyst may contain unreacted chemical substances derived from the raw materials used in the synthesis of component (b-2). As is well known, an organoaluminumoxy compound is synthesized generally by reacting a trialkylaluminum with $H_2O$, and a part of these starting materials may remain unreacted. An organoaluminumoxy compound, which contains these unreacted materials in an amount of less than 50% by weight, can be used as component (b-2). Specifically, for example, methylaluminoxane is synthesized by reacting trimethylaluminum with $H_2O$, and a part of at least one of these starting materials may remain unreacted and thus be contained in the obtained methylaluminoxane. In the above-mentioned synthesis method of an organoaluminumoxy compound, trialkylaluminum is generally used in an amount larger than that of $H_2O$ so that the trialkylaluminum, as an unreacted material, tends to be contained in the obtained organoaluminumoxy compound. In the present invention, two or more types of trialkylaluminum may be contained in the organoaluminumoxy compound.

In the present invention, the inorganic solid component (B) [hereinbelow, frequently referred to simply as "component (B)"] comprising a particulate inorganic solid (b-1) having hydroxyl groups on the surface thereof and, carried thereon, an organoaluminumoxy compound (b-2), can be prepared by contacting the particulate inorganic solid (b-1) with the organoaluminumoxy compound (b-2). It is considered that, by the contacting, component (b-1) reacts with component (b-2).

Such a reaction can be easily advanced by mixing and heating the particulate inorganic solid (b-1) and the organoaluminumoxy compound (b-2) in an inert hydrocarbon medium.

Representative examples of such inert hydrocarbon media include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethyl chloride, chlorobenzene and dichloromethane; and mixtures of them.

In mixing component (b-1) with component (b-2) in an inert hydrocarbon medium, it is preferred that the amount of component (b-2) be in the range of from $10^{-4}$ to 1 mol per g of component (b-1), more preferably from $10^{-3}$ to $10^{-1}$ mol per g of component (b-1), and that the concentration of component (b-2) in the inert hydrocarbon medium be in the range from $5\times10^{-2}$ to 5 mol/liter, more preferably from 0.1 to 3 mol/liter.

In the present invention, the molar amount of component (b-2) is calculated on the assumption that one alkylaluminumoxy unit represented by formula (5) is one molecule. Therefore, 1 mol of component (b-2) contains 1 gram-atom of aluminum.

In mixing component (b-1) with component (b-2), the reaction temperature is generally in the range of from −50 to 150° C., preferably from −20 to 120° C. However, it is not necessary to maintain the temperature within the above range during the mixing. Since the reaction of component (b-1) with component (b-2) is exothermic, it is preferred that the reaction temperature be controlled to a level as low as possible at the early stage of the reaction, and then elevated at the late stage of the reaction in order to complete the reaction. Specifically, the temperature at the early stage of the reaction is preferably in the range of from −50 to 50° C., more preferably of from −20 to 30° C., and the temperature at the late stage of the reaction is preferably in the range of from 50 to 150° C., more preferably of from 60 to 120° C. The contact time between component (b-1) and component (b-2) is generally in the range of from 0.5 to 100 hours, preferably from 1 to 50 hours.

In the present invention, the larger the atomic ratio ($Al_{b\text{-}2}/M$) of the aluminum ($Al_{b\text{-}2}$) in component (b-2) to the transition metal (M) in component (A), the higher the catalytic activity becomes, thus leading to an advantage from an economical view point. However, component (b-2) is generally expensive and, therefore, when the above-mentioned atomic ratio is excessively high, the economic advantage becomes rather low. Therefore, with respect to the atomic ratio ($Al_{b\text{-}2}/M$) of the aluminum ($Al_{b\text{-}2}$) in component (b-2) to the transition metal (M) in component (A), the upper limit is preferably 2,000, more preferably 1,000, most preferably 500, and the lower limit is preferably 10, more preferably 20, still more preferably 30, most preferably 100.

The amount of the organoaluminumoxy compound (b-2) carried on the particulate inorganic solid (b-1) is preferably in the range of from 0.5 to 500 mmol, more preferably from 1 to 50 mmol, most preferably from 3 to 30 mmol per g of component (b-1), in terms of the amount of aluminum ($Al_{b\text{-}2}$) in component (b-2).

In the present invention, examples of organoaluminum compound (C) [hereinbelow, frequently referred to simply as "component (C)"] include an organoaluminum compound represented by the formula (6)

$$R^7_nAlX_{3-n} \quad (6)$$

wherein $R^7$ represents a $C_1$–$C_{12}$ linear, branched or cyclic alkyl group or a $C_6$–$C_{20}$ aryl group; X represents a halogen atom or a hydrogen atom; and n is an integer of from 1 to 3.

Representative examples of $R^7$ in the formula (6) include a methyl group, an ethyl group, an n-propyl group, an isopropyl group, an isobutyl group, a pentyl group, a hexyl group, an octyl group, a cyclopentyl group, a cyclohexyl group, a phenyl group and a tolyl group.

Illustrative examples of organoaluminum compounds of formula (6) include trialkylaluminums, such as trimethylaluminum, triethylaluminum, triisopropylaluminum, triisobutylaluminum, trioctylaluminum and tri-2-ethylhexylaluminum; alkenylaluminums, such as isoprenylaluminum; dialkylaluminum halides, such as dimethylaluminum chloride, diethylaluminum chloride, diisopropylaluminum chloride, diisobutylaluminum chloride and dimethylaluminum bromide; alkylaluminum sesquihalides, such as methylaluminum sesquichloride, ethylaluminum sesquichloride, isopropylaluminum sesquichloride, butylaluminum sesquichloride and ethylaluminum sesquibromide; alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

As another example of component (C), a compound represented by the following formula (7) can be mentioned:

$$R^7_nAlY_{3-n} \quad (7)$$

wherein $R^7$ is as defined for formula (6); Y represents an —$OR^8$ group, an —$OSiR_3^9$ group, an —$OAlR_2^{10}$ group, an —$NR_2^{11}$ group, an —$SiR_3^{12}$ group or an —$N(R^{13})AlR_2^{14}$ group, wherein each of $R^8$, $R^9$, $R^{10}$ and $R^{14}$ independently represents a $C_1$–$C_{12}$ alkyl group or a $C_6$–$C_{20}$ aryl group, $R^{11}$ represents a hydrogen atom, a $C_1$–$C_{12}$ alkyl group, a $C_6$–$C_{20}$ aryl group, or a silyl group which is unsubstituted or substituted with at least one $C_1$–$C_{12}$ alkyl group, and each of $R^{12}$ and $R^{13}$ independently represents a $C_1$–$C_{12}$ alkyl group, with the proviso that each alkyl group independently possesses a linear, a branched or a cyclic configuration; and n is 1 or 2.

Illustrative examples of organoaluminum compounds represented by formula (7) include the following compounds:

(i) compounds represented by the formula: $R^7_nAl(OR^8)_{3-n}$ (for example, dimethylaluminum methoxide, diethylaluminum ethoxide and diisobutylaluminum methoxide and the like);

(ii) compounds represented by the formula: $R^7_nAl(OSiR^9_3)_{3-n}$ [for example, $Et_2Al(OSiMe_3)$, $(iso\text{-}Bu)_2Al(OSiMe_3)$, $(iso\text{-}Bu)_2Al(OSiEt_3)$ and the like];

(iii) compounds represented by the formula: $R^7_nAl(OAlR^{10}_2)_{3-n}$ [for example, $Et_2AlOAlEt_2$, $(iso\text{-}Bu)_2AlOAl(iso\text{-}Bu)_2$ and the like];

(iv) compounds represented by the formula: $R^7_nAl(NR^{11}_2)_{3-n}$ [for example, $Me_2AlNEt_2$, $Et_2AlNHMe$, $Me_2AlNHEt$, $Et_2AlN(SiMe_3)_2$, $(iso\text{-}Bu)_2AlN(SiMe_3)_2$ and the like];

(v) compounds represented by the formula: $R^7_nAl(SiR^{12}_3)_{3-n}$ [for example, $(iso\text{-}Bu)_2AlSiMe_3$ and the like]; and (vi) compounds represented by the formula:

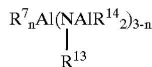

[for example,

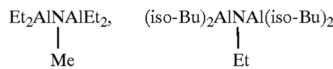

and the like].

In the above formulae, Me, Et and Bu represent a methyl group, an ethyl group and a butyl group, respectively.

Of the organoaluminum compounds represented by formula (6) and those represented by formula (7), $R^7_3Al$, $R^7_nAl(OR^8)_{3-n}$ and $R^7_nAl(OAlR^{10}_2)_{3-n}$ are preferred. Further, each of these compounds, wherein $R^7$ is an isoalkyl group and n is 2 or 3, is especially preferred. The above organoaluminum compounds can be used individually or in any combination.

In the present invention, the atomic ratio ($Al_c/Al_{b\text{-}2}$) of aluminum ($Al_c$) in the organoaluminum compound (C) to aluminum ($Al_{b\text{-}2}$) in the organoaluminumoxy compound (b-2) is generally from 0.01 to 5, preferably from 0.02 to 3.

In the present invention, by the use of the organoaluminum compound (C) in the polymerization catalyst, a high polymerization activity can be achieved. The reason for this is considered to reside in that component (C) faciliates the alkylation of component (A). Further explanation is made below with respect to this effect achieved by the use of component (C).

In the preparation of a catalyst, when a particulate inorganic solid (b-1) having the hydroxyl group content adjusted to a predetermined level which is prepared by contacting a particulate inorganic solid having hydroxyl groups on the surface thereof with an organoaluminum compound is used, a polymerization activity can be exerted to some extent, even without separately adding organoaluminum compound (C). The reason for this is considered to reside in that, due to some factors, such as non-uniformity of the reaction [for preparing component (B)] between the particulate inorganic solid and the organoalumium compound, the resultant reaction mixture contains the unreacted organoaluminum compound which facilitates the alkylation of the transition metal compound. However, for obtaining a catalyst capable of effectively and stably exerting high polymerization activity, the use of a separate component (C) of the polymerization catalyst as defined in the present invention is required. One of the reasons for this resides in that, by use of component (C) in the polymerization catalyst, it becomes possible to neutralize or negate impurities which adversely affect the polymerization. Such neutralization or negation is practically equivalent to elimination of the impurities. Therefore, the catalyst can stably exert satisfactorily high polymerization activity during the polymerization. Furthermore, component (C) is effective for suppressing aggregation of the polymer. The reason for this is considered to reside in that component (C) serves to suppress generation of static electricity during the polymerization. However, the exact mechanism of the aggregation suppression has not yet been fully elucidated.

By use of the above-mentioned olefin polymerization catalyst comprising components (A), (B) and (C) described above, the homopolymerization of ethylene or the copolymerization of ethylene with a comonomer can be advantageously carried out to thereby obtain the high density ethylene polymer of the present invention.

With respect to the method for producing the high density ethylene polymer of the present invention, which is conducted in the presence of the olefin polymerization catalyst comprising the above-mentioned components (A), (B) and (C), detailed explanation is made below.

As to how to combine components (A), (B) and (C) and form the olefin polymerization catalyst to be used in a system for homopolymerizing or copolymerizing ethylene, there can be mentioned, for example, the following methods:

a method in which an intimate mixture of components (B) and (C) is formed, and the intimate mixture and component (A) are separately introduced into the system for homopolymerizing or copolymerizing ethylene, to thereby effect the polymerization reaction;

a method in which an intimate mixture of components (A) and (B) is formed, and the intimate mixture and component (C) are separately introduced into the system for homopolymerizing or copolymerizing ethylene, to thereby effect the polymerization reaction;

a method in which an intimate mixture of components (A), (B) and (C) is formed, and the intimate mixture is introduced into the system for homopolymerizing or copolymerizing ethylene, to thereby effect the polymerization reaction; and a method in which components (A), (B) and (C) are separately introduced into the system for homopolymerizing or copolymerizing ethylene, to thereby effect the polymerization reaction.

Each of these methods is advantageous not only in that a high polymerization activity can be achieved, but also in that such a high polymerization activity can be stably maintained during the polymerization. Among the above-mentioned methods, it is preferred to use the method in which the intimate mixture of components (B) and (C), and the component (A), are separately introduced into the system for homopolymerizing or copolymerizing ethylene, and the method in which the intimate mixture of components (A) and (B), and the component (C), are separately introduced into the system for homopolymerizing or copolymerizing ethylene.

In the method for producing the high density ethylene polymer of the present invention, when ethylene is copolymerized with a comonomer, the comonomer is generally used in an amount of not more than 1 mol %, preferably not more than 0.5 mol %, more preferably not more than 0.2 mol %, still more preferably not more than 0.1 mol %, based on the total amount of ethylene and the comonomer. When a comonomer is used in an amount of more than 1 mol %, based on the total amount of ethylene and the comonomer, the resultant copolymer is likely to have a disadvantageously low density, so that practical problems, such as lowering of the stiffness of the copolymer, are likely to arise.

In the present invention, it is preferred that the high density ethylene polymer be produced by homopolymerizing ethylene or copolymerizing ethylene with at least one comonomer selected from the group consisting of an α-olefin represented by the formula $H_2C=CHR^{15}$ (wherein $R^{15}$ is a $C_1$–$C_{18}$ linear, branched or cyclic alkyl group or a $C_6$–$C_{20}$ aryl group), a $C_3$–$C_{20}$ cyclic olefin, and a $C_4$–$C_{20}$ linear, branched or cyclic diene, in the presence of the above-mentioned polymerization catalyst comprising components (A), (B) and (C).

Examples of α-olefins-represented by the formula $H_2C=CHR^{15}$ (wherein $R^{15}$ is a $C_1$–$C_{18}$ linear, branched or cyclic alkyl group or a $C_6$–$C_{20}$ aryl group) include propylene, 1-butene, 1-pentene, 1-hexene, 4-methyl-1-propylene, 1-octene, 1-decene, 1-dodecene, 1-tetradecene, 1-hexadecene, 1-octadecene, 1-eicosene, vinylcyclohexane and styrene. Examples of $C_3$–$C_{20}$ cyclic olefins include cyclopentene, cycloheptene, norbornene, 5-methyl-2-norbornene, tetracyclododecene and 2-methyl-1.4,5.8-dimethano-1,2,3,4,4a,5,8,8a-octahydronaphthalene. Examples of $C_4$–$C_{20}$ linear, branched or cyclic dienes include 1,3-butadiene, 1,4-pentadiene, 1,5-hexadiene, 1,4-hexadiene and cyclohexadiene.

The density and properties of the ethylene polymer can be controlled by appropriately selecting a comonomer from the above-mentioned comonomers, and copolymerizing ethylene with the comonomer.

In the present invention, the polymerization and copolymerization of ethylene can be conducted by either a suspension polymerization method or a gaseous phase polymerization method.

When a suspension polymerization is employed, the same solvent as the above-mentioned inert hydrocarbon solvents usable for preparing component (B) can be used. A certain olefin can also be used as the solvent.

In the polymerization method of the present invention using the above-mentioned polymerization catalyst, it is preferred that the amount of the catalyst fed to the system for homopolymerizing or copolymerizing ethylene be controlled so that the amount of component (B) becomes 1 to 0.001% by weight, relative to the total weight of the polymer obtained per hour. The polymerization temperature is generally not lower than 0° C., preferably not lower than 50° C., more preferably not lower than 60° C., and, on the other hand, generally not higher than 150° C., preferably not higher than 110° C., more preferably not higher than 100° C. The polymerization pressure is generally from atmospheric pressure to 100 kg/cm$^2$, preferably from 2 to 50 kg/cm$^2$, more preferably from 5 to 30 kg/cm$^2$. The polymerization reaction can be conducted in a batchwise, a semicontinuous or a continuous manner. Further, the polymerization reaction can be conducted in at least two stages, wherein the respective reaction conditions in the two stages are different from each other.

The molecular weight of the ethylene polymer can be controlled by introducing hydrogen gas into the polymerization reaction system or by controlling the polymerization temperature (see, for example, DE 3127133.2). For example, by maintaining a predetermined amount ratio of the introduced hydrogen gas to the ethylene in the polymerization reaction system during the reaction, a high density ethylene polymer having a predetermined molecular weight can be easily obtained. In the present invention, it is recommended to control the molecular weight of the high density ethylene polymer by the above-mentioned method in which a predetermined amount ratio of the introduced hydrogen gas to the ethylene is maintained in the polymerization reaction system during the reaction.

In the present invention, the olefin polymerization catalyst can contain other components than mentioned above, which have favorable effects on the olefin polymerization.

BEST MODE FOR CARRYING OUT THE INVENTION

The present invention will now be further illustrated in more detail with reference to the following Examples and Comparative Examples, which should not be construed as limiting the scope of the present invention.

EXAMPLE 1

[Preparation of a suspension of silica having methylaluminoxane carried thereon]

In a 200 ml glass flask which had been fully purged with nitrogen gas were placed 4.0 g of silica (which is manufactured and sold by Fuji Silysia Chemical Ltd., Japan, and has a pore volume of 1.10 cm$^3$/g, a specific surface area of 318 m$^2$/g, a bulk density of 0.38 g/cm$^3$ and a hydroxyl group content of 4.1% by weight) and 40 ml of toluene, and stirring was conducted to obtain a suspension. The obtained suspension was cooled to −10° C. To the cooled suspension was dropwise added 30 ml of a solution of methylaluminoxane (manufactured by Albemarle Corporation, U.S.A.) in toluene (Al concentration: 1.0 mol/liter) over 1 hour, while maintaining the temperature of the suspension at −10° C. The temperature of the resultant mixture was maintained at 0° C. for 1 hour, then at room temperature for 1 hour, and then, at 110° C. for 3 hours, to thereby effect a reaction. During a series of the above operations, generation of methane gas from the mixture was observed. Then, the mixture was cooled to 20° C., so that a suspension of silica having methylaluminoxane (MAO) carried thereon was obtained.

[Polymerization]

In a 1.6 liter stainless autoclave as a polymerizer, which had been fully purged with nitrogen gas, was placed 0.8 liter of hexane. Then, to the autoclave was added 0.2 mmol of triisobutylaluminum and further added the above-prepared silica suspension in an amount of 0.3 mmol in terms of the amount of aluminum of methylaluminoxane carried on the silica. Then, to the polymerizer was introduced 10 N ml of hydrogen and further introduced ethylene, so that the internal pressure of the polymerizer became 7 kg/cm$^2$-G. The internal temperature of the polymerizer was adjusted to 65° C.

A solution of bis(indenyl)zirconium dichloride in toluene (concentration: 2.5 mmol/liter) was introduced to the polymerizer in an amount of 1.0 μmol in terms of the amount of zirconium and, immediately after that, the internal temperature of the polymerizer was elevated to 70° C., to thereby start a polymerization reaction of the ethylene.

The polymerization reaction was carried out while maintaining the temperature at 70° C. and maintaining the internal pressure of the polymerizer at 7 $kg/cm^2$-G by supplying ethylene gas to the polymerizer. Hydrogen was introduced to the polymerizer, in an amount of 130 ml (NTP) relative to 1 $kg/cm^2$-G of the consumed ethylene. The polymerization reaction was continued until the total amount of the consumed ethylene reached 1.5 $kg/cm^2$-G.

After completion of the polymerization reaction, the reaction mixture obtained in the polymerizer was transferred to a stainless container containing methanol. The resultant mixture was subjected to filtration to thereby obtain a polymer. The obtained polymer was dried at 50° C. overnight.

The polymerizer was opened, and the inside thereof was examined. No polymer adhering to the inner wall and the like of the polymerizer was observed.

The reaction conditions and results of the polymerization are shown in Tables 1 and 2.

Figure 2:
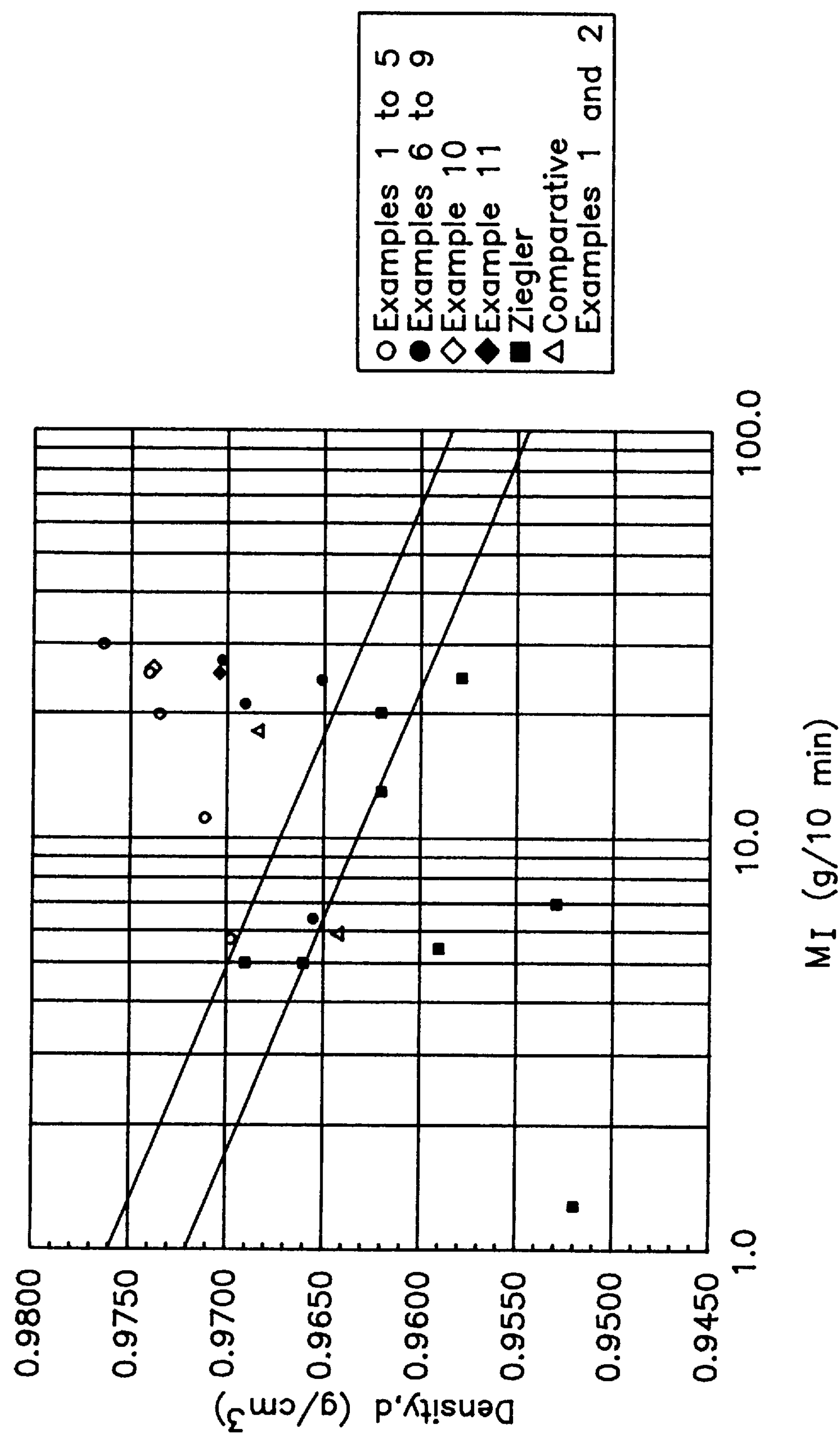
FIG. 2 shows the relationship between the $M_I$ and the density with respect to each of the high density ethylene polymers of the present invention, in comparison with the relationship between those of each of the comparative ethylene polymers.
Figure 3:
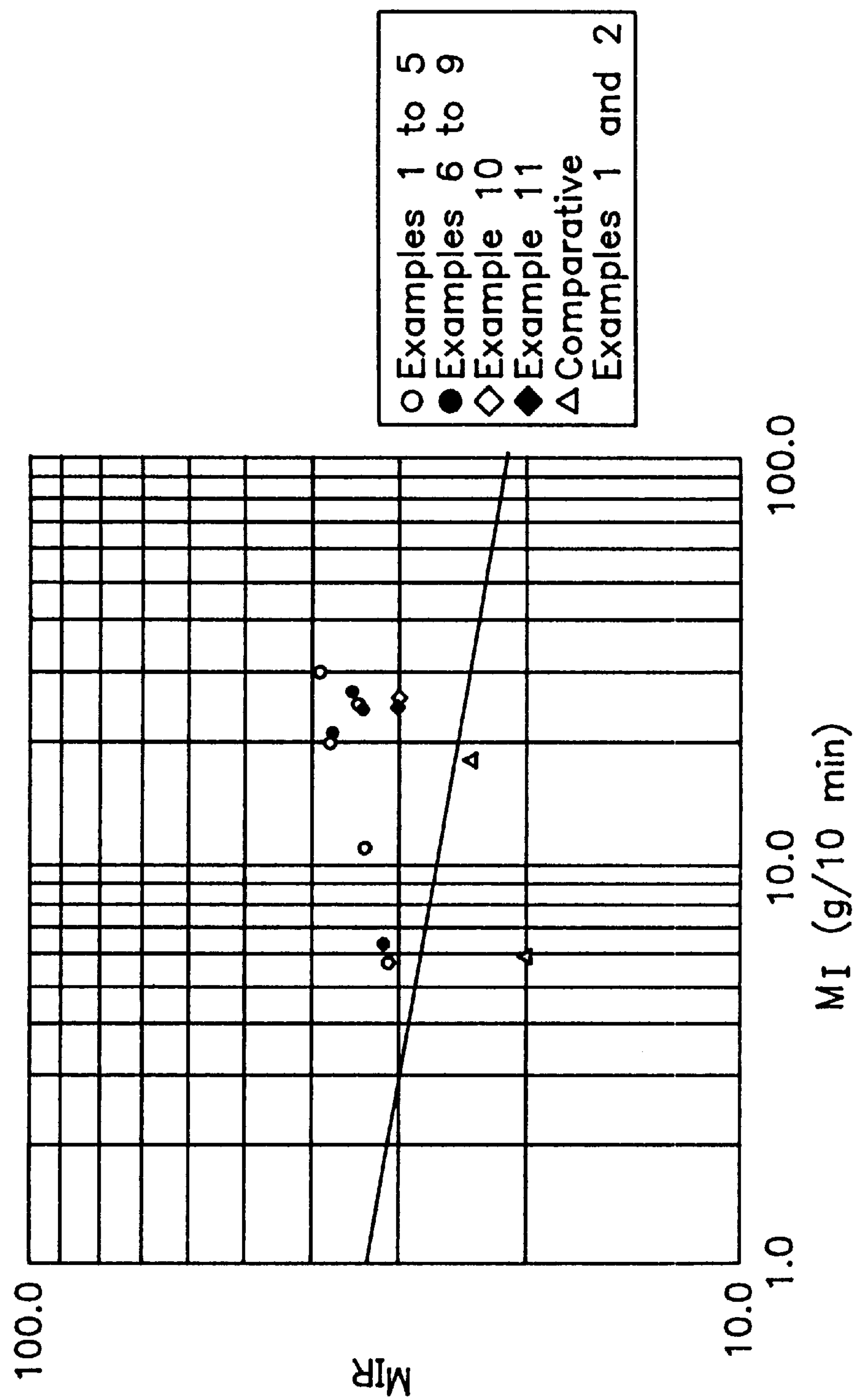
FIG. 3 shows the relationship between the $M_I$ and the $M_{IR}$ with respect to each of high density ethylene polymers of the present invention, in comparison with the relationship between those of each of comparative ethylene polymers.

With respect to the obtained polymer, the relationship between the $M_I$ and the Izod impact strength, the relationship between the $M_I$ and the density (d) and the relationship between the $M_I$ and the $M_{IR}$ are shown in FIGS. 1 to 3, respectively.

Figure 4:
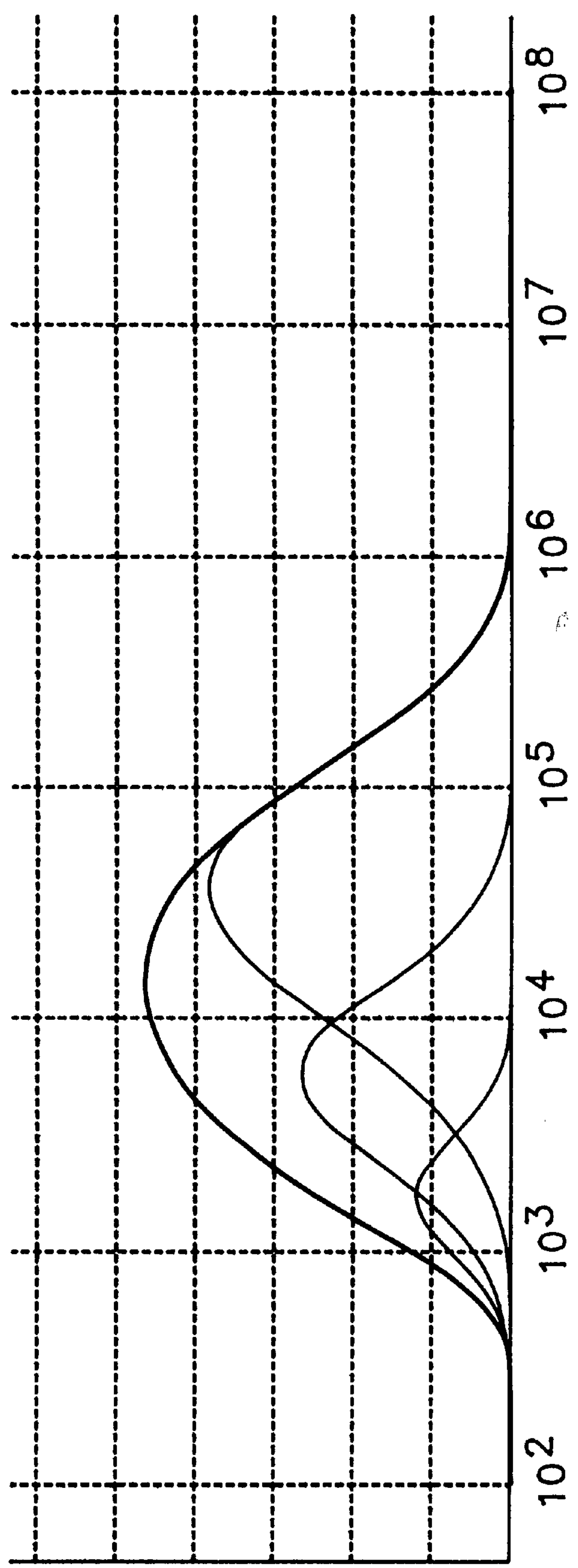
FIG. 4 shows the molecular weight distribution curve (which is indicated by a bold line) of the high density ethylene polymer obtained in Example 1, together with a plurality of Gaussian distribution curves (which are indicated by thin lines) obtained by the resolution of the molecular weight distribution curve.

Further, with respect to the obtained polymer, the molecular weight distribution curve and a plurality of Gaussian distribution curves obtained by the resolution of the molecular weight distribution curve are shown in FIG. 4.

EXAMPLES 2 to 5

Polymerization reactions were individually conducted in substantially the same manner as in Example 1, except that the total amount of hydrogen introduced to the polymerizer was varied.

The reaction conditions and results of the polymerization are shown in Tables 1 and 2.

With respect to each of the obtained polymers the relationship between the $M_I$ and the Izod impact strength, the relationship between the $M_I$ and the density (d), and the relationship between the $M_I$ and the $M_{IR}$ are shown in FIGS. 1 to 3, respectively.

EXAMPLES 6 to 9

Polymerization reactions were individually conducted in substantially the same manner as in Example 1, except that various amounts of 1-hexene were added to the polymerizer as a comonomer.

The reaction conditions, such as the amount of 1-hexene added, and results of the polymerization are shown in Tables 1 and 2.

With respect to each of the obtained polymers the relationship between the $M_I$ and the Izod impact strength, the relationship between the $M_I$ and the density (d), and the relationship between the $M_I$ and the $M_{IR}$ are shown in FIGS. 1 to 3, respectively.

EXAMPLE 10

Polymerization reaction was conducted in substantially the same manner as in Example 1, except that bis(1,3-dimethylcyclopentadienyl)zirconium dichloride was used instead of bis(indenyl)zirconium dichloride and that the amount of hydrogen introduced to the polymerizer was changed.

The reaction conditions and results of the polymerization are shown in Tables 1 and 2.

With respect to the obtained polymer, the relationship between the $M_I$ and the Izod impact strength, the relationship between the $M_I$ and the density (d), and the relationship between the $M_I$ and the $M_{IR}$ are shown in FIGS. 1 to 3, respectively.

Figure 5:
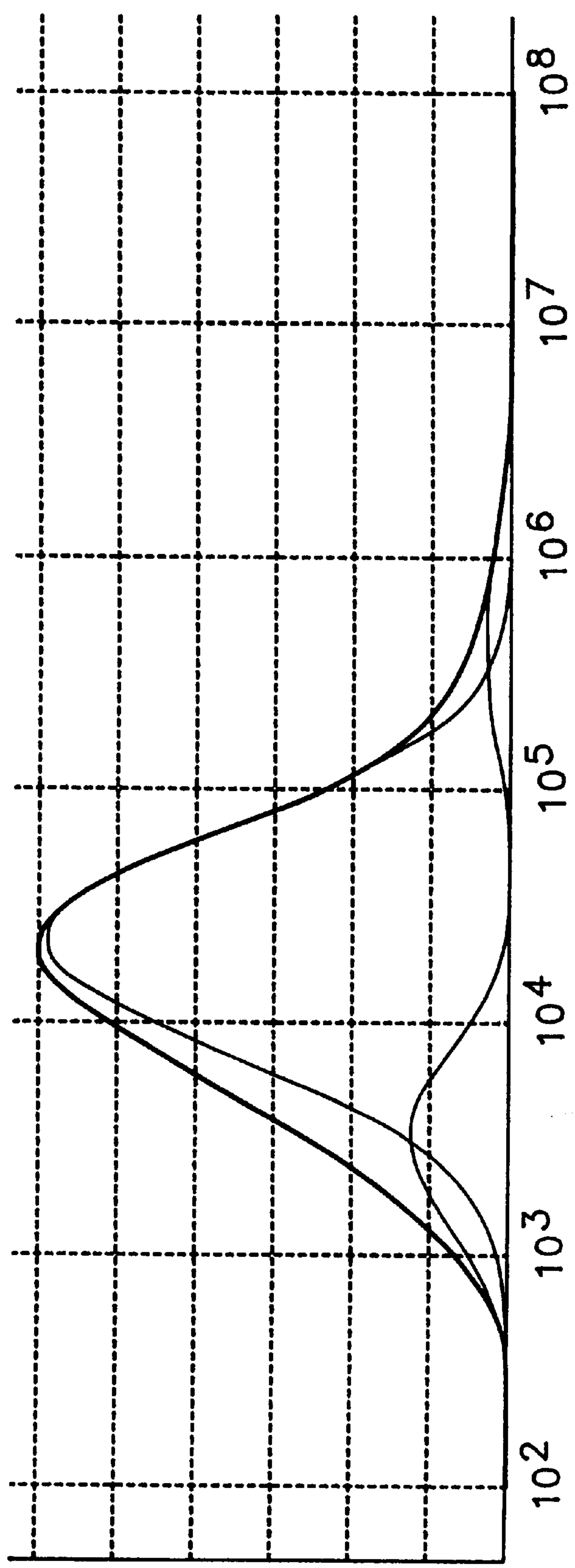
FIG. 5 shows the molecular weight distribution curve (which is indicated by a bold line) of the high density ethylene polymer obtained in Example 10, together with a plurality of Gaussian distribution curves (which are indicated by thin lines) obtained by the resolution of the molecular weight distribution curve.

Further, with respect to the obtained polymer, the molecular weight distribution curve and a plurality of Gaussian distribution curves obtained by the resolution of the molecular weight distribution curve are shown in FIG. 5.

EXAMPLE 11

Polymerization reaction was conducted in substantially the same manner as in Example 10, except that 1-hexene was added to the polymerizer as a comonomer.

The reaction conditions, such as the amount of 1-hexene added and results of the polymerization are shown in Tables 1 and 2.

With respect to the obtained polymer, the relationship between the $M_I$ and the Izod impact strength, the relationship between the $M_I$ and the density (d), and the relationship between the $M_I$ and the $M_{IR}$ are shown in FIGS. 1 to 3, respectively.

Comparative Example 1 and 2

Polymerization reactions were individually conducted in substantially the same manner as in Example 1 except that (n-butylcyclopentadienyl)zirconium dichloride was employed instead of bis(indenyl)zirconium dichloride and that the amount of hydrogen introduced to the polymerizer was varied.

The reaction conditions and the results of the polymerization are shown in Tables 1 and 2.

With respect to each of the obtained polymer, the relationship between the $M_I$ and the Izod impact strength, the relationship between the $M_I$ and the density (d) and the relationship between the $M_I$ and the $M_{IR}$ are shown in FIGS. 1 to 3, respectively.

Further, with respect to ethylene polymers produced using a conventional Ziegler-Natta catalyst, the relationship between the $M_I$ and the Izod impact strength and the relationship between the $M_I$ and the density (d) are also shown in FIGS. 1 and 2, respectively.

TABLE 1

| | Zr (μmol) | MAO (mmol) | $H_2$ (ml) (NTP) | 1-Hexene (mmol) | Yieid (g) |
|---|---|---|---|---|---|
| Example 1 | A, 1.0 | 0.3 | 192 | 0 | 43 |
| Example 2 | A, 1.0 | 0.3 | 128 | 0 | 47 |
| Example 3 | A, 1.0 | 0.3 | 91 | 0 | 45 |
| Example 4 | A, 1.0 | 0.3 | 64 | 0 | 47 |
| Example 5 | A, 1.0 | 0.3 | 290 | 0 | 46 |
| Example 6 | A, 1.0 | 0.3 | 189 | 40 | 40 |
| Example 7 | A, 1.0 | 0.3 | 131 | 40 | 48 |
| Example 8 | A, 1.0 | 0.3 | 67 | 40 | 43 |
| Example 9 | A, 1.0 | 0.3 | 185 | 80 | 45 |
| Example 10 | B, 2.0 | 0.6 | 147 | 0 | 41 |
| Example 11 | B, 2.0 | 0.6 | 147 | 80 | 47 |
| Comparative Example 1 | C, 1.0 | 0.3 | 40 | 0 | 45 |

TABLE 1-continued

| | Zr (μmol) | MAO (mmol) | $H_2$ (ml) (NTP) | 1-Hexene (mmol) | Yieid (g) |
|---|---|---|---|---|---|
| Comparative Example 2 | C, 1.0 | 0.3 | 80 | 0 | 48 |

[Note]
A: bis(indenyl)zirconium dichloride
B: bis(1,3-dimethylcyclopentadienyl)zirconium dichloride
C: bis(n-butylcyclopentadienyl)zirconium dichloride
MAO: methylaluminoxane

TABLE 2

| | $M_I$ (g/10 min) | $H_{MI}$ (g/10 min) | $M_{IR}$ | Density, d (g/cm$^3$) | Amount of Comonomer (mol %) | Mw | Mw/Mn | Izod Impact Strength (kgf · cm/cm$^2$) |
|---|---|---|---|---|---|---|---|---|
| Example 1 | 25.1 | 862 | 34.3 | 0.9741 | — | 46,000 | 8.2 | 3.5 |
| Example 2 | 19.8 | 747 | 37.7 | 0.9736 | — | 49,000 | 8.1 | 4.5 |
| Example 3 | 11.1 | 372 | 33.5 | 0.9712 | — | 58,000 | 8.0 | 7.0 |
| Example 4 | 5.7 | 175 | 31.0 | 0.9698 | — | 70,000 | 7.9 | 12.0 |
| Example 5 | 30.1 | 1170 | 38.9 | 0.9765 | — | 43,000 | 8.7 | 3.5 |
| Example 6 | 27.0 | 945 | 35.0 | 0.9703 | 0.07 | 45,000 | 8.3 | 4.0 |
| Example 7 | 21.1 | 789 | 37.4 | 0.9691 | 0.09 | 48,000 | 8.2 | 5.0 |
| Example 8 | 6.4 | 202 | 31.5 | 0.9655 | 0.05 | 68,000 | 8.0 | 13.5 |
| Example 9 | 24.5 | 831 | 33.9 | 0.9651 | 0.15 | 47,000 | 8.1 | 4.5 |
| Example 10 | 26.0 | 785 | 30.2 | 0.9739 | — | 67,000 | 8.5 | 3.5 |
| Example 11 | 25.1 | 761 | 30.3 | 0.9705 | 0.06 | 65,000 | 8.4 | 4.0 |
| Comparative Example 1 | 5.9 | 117 | 20.0 | 0.9642 | — | 66,000 | 2.7 | 9.5 |
| Comparative Example 2 | 18.1 | 433 | 23.9 | 0.9684 | — | 47,000 | 2.8 | 2.5 |

INDUSTRIAL APPLICABILITY

The high density ethylene polymer of the present invention has excellent moldability, such as high melt flowability and excellent extrusion moldability, so that the ethylene polymer can be advantageously used especially in injection molding method. Further, the high density ethylene polymer of the present invention can be advantageously used for producing an excellent molded article which has not only excellent mechanical properties, such as high impact resistance and high stiffness, but also excellent appearance, such as high transparency and excellent surface gloss.

We claim:

1. A high density ethylene polymer comprising a homopolymer of ethylene, or a copolymer of ethylene with at least one comonomer selected from the group consisting of α-olefins, and having the following properties (a) to (h):

(a) a density d (g/cm$^3$) of from 0.951 to 0.980;

(b) an $M_I$ (g/10 minutes) of more than 10 and not more than 80, wherein $M_I$ is defined as the melt flow rate as measured at 190° C. under a load of 2.16 kg;

(c) said ethylene polymer satisfying the following relationship:

$$\log a_{kI} \geqq -0.844 \log M_I + 1.462$$

wherein $M_I$ is as defined above, and $a_{kI}$ represents the Izod impact strength (kgf·cm/cm$^2$);

(d) said ethylene polymer satisfying the following relationship:

$$\log M_{IR} \geqq -0.094 \log M_I + 1.520$$

wherein $M_I$ is as defined above, and $M_{IR}$ represents the $H_{MI}/M_I$ ratio in which $H_{MI}$ (g/10 minutes) is defined as the melt flow rate as measured at 190° C. under a load of 21.6 kg and $M_I$ is as defined above; wherein (e) said density d (g/cm$^3$) and said $M_I$ (g/10 minutes) satisfy the following relationship:

$$d \geqq -0.00873 \log M_I + 0.972, \text{ and}$$

(f) said $M_{IR}$ is not less than 25 and not more than 40;

(g) an Mw of 30,000 or more, wherein Mw is defined as a weight average molecular weight measured by gel permeation chromatography; and (h) an Mw/Mn ratio in the range of from 5.5 to 10.0, wherein Mw and Mn, respectively, represent the weight average molecular weight and the number average molecular weight, each measured by gel permeation chromatography.

2. The high density ethylene polymer according to claim 1 which is an injection molding material.

3. The high density ethylene polymer according to claim 1, wherein said density d is 0.955 or more.

4. The high density ethylene polymer according to claim 1, which is a copolymer of ethylene with at least one comonomer selected from the group consisting of α-olefins each of which is represented by the formula $H_2C{=}CHR^{15}$ wherein $R^{15}$ is a $C_1$–$C_{18}$ linear, branched or cyclic alkyl group or a $C_6$–$C_{20}$aryl group, and wherein said comonomer is present in an amount of not more than 1 mole %, based on the total number of moles of all monomer units constituting said ethylene polymer.

5. The ethylene polymer according to claim 4, wherein said comonomer is selected from the group consisting of propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene and vinylcyclohexane.

6. A method for producing a high density ethylene polymer of claim 1, which comprises homopolymerizing ethylene or copolymerizing ethylene with at least one comonomer selected from the group consisting of α-olefins, wherein the comonomer is used in an amount of not more than 1 mol %, based on the total amount of ethylene and the comonomer, in the presence of a catalyst comprising the following components (A), (B) and (C):

(A) a transition metal compound represented by the formula (1)

$$R^1R^2R^3R^4M \quad (1)$$

wherein:

M is zirconium;

each of $R^1$ and $R^2$ independently represents:

an indenyl group which is unsubstituted or substituted with at least one substituent selected from the group consisting of a $C_1$–$C_{20}$ alkyl group, a $C_6$–$C_{20}$ aryl group, an aralkyl group having a $C_1$–$C_{20}$ alkyl group substituted with at least one $C_6$–$C_{20}$ aryl group, and an alkylaryl group having a $C_6$–$C_{20}$ aryl group substituted with at least one $C_1$–$C_{20}$ alkyl group, wherein each alkyl group is independently of a linear, a branched or a cyclic configuration and wherein at least one carbon atom of said at least one substituent is optionally replaced by a silicon atom, said substituted indenyl group optionally having a substitution in which at least two positions thereof together are substituted with one multivalent group derived from a substituent selected from said at least one substituent, said substituted indenyl group independently and optionally having at least one substituent thereof bonded thereto through an oxygen, a nitrogen, a sulfur or a phosphorus atom;

each of $R^3$ and $R^4$ independently represents a hydrogen atom, a halogen atom, a $C_1$–$C_{20}$ alkyl group, a $C_6$–$C_{20}$ aryl group, an aralkyl group having a $C_1$–$C_{20}$ alkyl group substituted with at least one $C_6$–$C_{20}$ aryl group, an alkylaryl group having a $C_6$–$C_{20}$ aryl group substituted with a $C_1$–$C_{20}$ alkyl group, or a —$SO_3R^5$ group wherein $R^5$ is a hydrocarbon group which is unsubstituted or substituted with at least one halogen atom, wherein each alkyl group is independently of a linear, a branched or a cyclic configuration and wherein at least one carbon atom of at least one of said alkyl, aryl, aralkyl and alkylaryl groups is optionally replaced by a silicon atom; and each of $R^1$ $R^2$ $R^3$ and $R^4$ is bonded to said transition metal M;

(B) an inorganic solid component comprising a particulate inorganic solid (b-1) having hydroxyl groups on a surface thereof and, carried thereon, an organoaluminumoxy compound (b-2) having repeating alkyloxyaluminum units each represented by the formula (5)

(5)

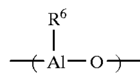

wherein R6 represents a $C_1$–$C_4$ linear or branched alkyl group; and (C) an organoaluminum compound, wherein said components (B) and (C) are intimately mixed and contacted with each other to form an intimate mixture of components (B) and (C), and said intimate mixture and said component (A) are separately introduced into a system for homopolymerizing or copolymerizing ethylene, followed by polymerization at a temperature of from 0° C. to 150° C. under a pressure of from atmospheric pressure to 100 kg/$cm^2$ while introducing hydrogen gas into the system for homopolymerizing or copolymerizing ethylene, wherein the amount of the catalyst fed to the system for homopolymerizing or copolymerizing ethylene is controlled so that the amount of component (B) becomes 1 to 0.001% by weight, relative to the total weight of the polymer obtained per hour, and wherein in said component (B), said particulate inorganic solid (b-1) having hydroxyl groups on the surface thereof is silica.

7. The method according to claim 6, wherein said component (C) is a compound represented by the following formula (6) or (7):

$$R_n^7AlX_{3-n} \quad (6)$$

wherein $R^7$ represents a $C_1$–$C_{12}$ linear, branched or cyclic alkyl group or a $C_6$–$C_{20}$ aryl group; X represents a halogen atom or a hydrogen atom; and n is an integer of from 1 to 3; or $$R_n^7AlY_{3-n} \quad (7)$$

wherein $R^7$ is as defined for formula (6); Y represents an —$OR^8$ group, an —$OSiR_3^9$ group, an —$AlR_2^{10}$ group, an —$NR_2^{11}$ group, an —$SiR_3^{12}$ group or an —$N(R^{13})AlR_2^{14}$ group, wherein each of $R^8$, $R^9$, $R^{10}$ and $R^{14}$ independently represents a $C_1$–$C_{12}$ alkyl group or a $C_6$–$C_{20}$ aryl group, $R^{11}$ represents a hydrogen group, a $C_1$–$C_{12}$ alkyl group, a $C_6$–$C_{20}$ aryl group or a silyl group which is unsubstituted or substituted with at least one $C_1$–$C_{12}$ alkyl group, and each of $R^{12}$ and $R^{13}$ independently represents a $C_1$–$C_{12}$ alkyl group, with the proviso that each alkyl group is independently of a linear, a branched or a cyclic configuration; and n is 1 or 2.

8. The method according to claim 6 or 7, wherein, in copolymerizing ethylene, ethylene is copolymerized with at least one comonomer selected from the group consisting of α-olefins each of which is represented by the formula $H_2C{=}CHR^{15}$ wherein $R^{15}$ is a $C_1$–$C_{18}$ linear, branched or cyclic alkyl group or a $C_6$–$C_{20}$ aryl group, and wherein said comonomer is used in an amount of not more than 1 mole %, based on the total number of moles of the ethylene and the comonomer.

* * * * *